United States Patent
Kamiya et al.

(10) Patent No.: US 9,505,388 B2
(45) Date of Patent: Nov. 29, 2016

(54) HYDRAULIC BRAKE SYSTEM AND HYDRAULIC PRESSURE CONTROLLER

(71) Applicants: TOYOTA JIDOSHA KABUSHIKI KAISHA, Toyota-shi (JP); ADVICS CO., LTD., Kariya (JP)

(72) Inventors: Yusuke Kamiya, Okazaki (JP); Kiyoyuki Uchida, Konan (JP); Masaki Ninoyu, Obu (JP); Takahiro Okano, Chiryu (JP)

(73) Assignees: TOYOTA JIDOSHA KABUSHIKI KAISHA, Toyota-shi (JP); ADVICS CO., LTD., Kariya (JP)

( * ) Notice: Subject to any disclaimer, the term of this patent is extended or adjusted under 35 U.S.C. 154(b) by 8 days.

(21) Appl. No.: 14/317,315

(22) Filed: Jun. 27, 2014

(65) Prior Publication Data
US 2015/0015059 A1 Jan. 15, 2015

(30) Foreign Application Priority Data
Jul. 10, 2013 (JP) .................................. 2013-144683

(51) Int. Cl.
*B60T 13/122* (2006.01)
*B60T 11/228* (2006.01)
*B60T 11/16* (2006.01)
(Continued)

(52) U.S. Cl.
CPC .............. *B60T 11/228* (2013.01); *B60T 7/042* (2013.01); *B60T 11/16* (2013.01); *B60T 13/146* (2013.01); *B60T 13/662* (2013.01); *B60T 13/686* (2013.01); *Y10T 137/7781* (2015.04)

(58) Field of Classification Search
CPC .. B60T 13/142; B60T 13/147; B60T 13/662; B60T 13/686; B60T 8/48; B60T 8/171; B60T 11/16; B60T 11/228; B60T 7/042; B60T 13/14; B60T 13/168; B60T 8/4077
See application file for complete search history.

(56) References Cited

U.S. PATENT DOCUMENTS

| 9,272,694 B2 * | 3/2016 | Kamiya ................. B60T 13/662 |
| 2002/0084691 A1 * | 7/2002 | Isono ...................... B60T 8/4081 303/10 |

(Continued)

FOREIGN PATENT DOCUMENTS

| CN | 102248937 A | 11/2011 |
| JP | 11-105687 A | 4/1999 |

(Continued)

*Primary Examiner* — Christopher Schwartz
(74) *Attorney, Agent, or Firm* — Oblon, McClelland, Maier & Neustadt, L.L.P.

(57) ABSTRACT

A hydraulic brake system includes: a master cylinder including a pressurizing piston; a brake cylinder for a hydraulic brake operable by a hydraulic pressure in a front pressure chamber defined in front of the pressurizing piston; and a rear-hydraulic pressure controller connected to a rear chamber defined at a rear of the pressurizing piston. The rear-hydraulic pressure controller controls a hydraulic pressure in the rear chamber and includes: a regulator, operable by at least one of the hydraulic pressure in the front pressure chamber and a control pressure controlled electrically, for supplying an output hydraulic pressure to the rear chamber; and a master-pressure-operating-state detector configured to, when the output hydraulic pressure is greater than a threshold value, detect that the regulator is in a master-pressure operating state in which the regulator is operated by at least the hydraulic pressure in the front pressure chamber.

10 Claims, 9 Drawing Sheets

(51) Int. Cl.
*B60T 7/04* (2006.01)
*B60T 13/14* (2006.01)
*B60T 13/66* (2006.01)
*B60T 13/68* (2006.01)

(56) References Cited

U.S. PATENT DOCUMENTS

| | | | |
|---|---|---|---|
| 2003/0222498 A1 | 12/2003 | Toelge | |
| 2004/0084959 A1* | 5/2004 | Kusano | B60T 8/266 303/119.2 |
| 2011/0285199 A1* | 11/2011 | Ishida | B60T 7/042 303/3 |
| 2013/0127240 A1* | 5/2013 | Noro | B60T 13/58 303/14 |
| 2013/0127241 A1* | 5/2013 | Sakata | B60T 13/58 303/14 |
| 2013/0255249 A1* | 10/2013 | Maruyama | F15B 15/02 60/562 |
| 2014/0008967 A1* | 1/2014 | Takeuchi | B60T 13/161 303/155 |
| 2014/0327296 A1* | 11/2014 | Ishida | B60T 7/042 303/10 |
| 2015/0015061 A1* | 1/2015 | Masuda | B60T 8/17 303/10 |
| 2015/0021979 A1* | 1/2015 | Kamiya | B60T 8/326 303/20 |
| 2015/0151729 A1* | 6/2015 | Yamasoe | B60T 7/042 303/122.03 |
| 2015/0175145 A1* | 6/2015 | Nakata | B60T 17/222 188/352 |
| 2015/0203088 A1* | 7/2015 | Kuki | B60T 8/17 303/119.1 |
| 2016/0039402 A1* | 2/2016 | Kamiya | B60T 8/4077 303/10 |

FOREIGN PATENT DOCUMENTS

| | | |
|---|---|---|
| JP | 2004-515412 A | 5/2004 |
| JP | 2011-235721 | 11/2011 |
| JP | 2013-010505 A | 1/2013 |
| JP | 2013-43489 | 3/2013 |

* cited by examiner

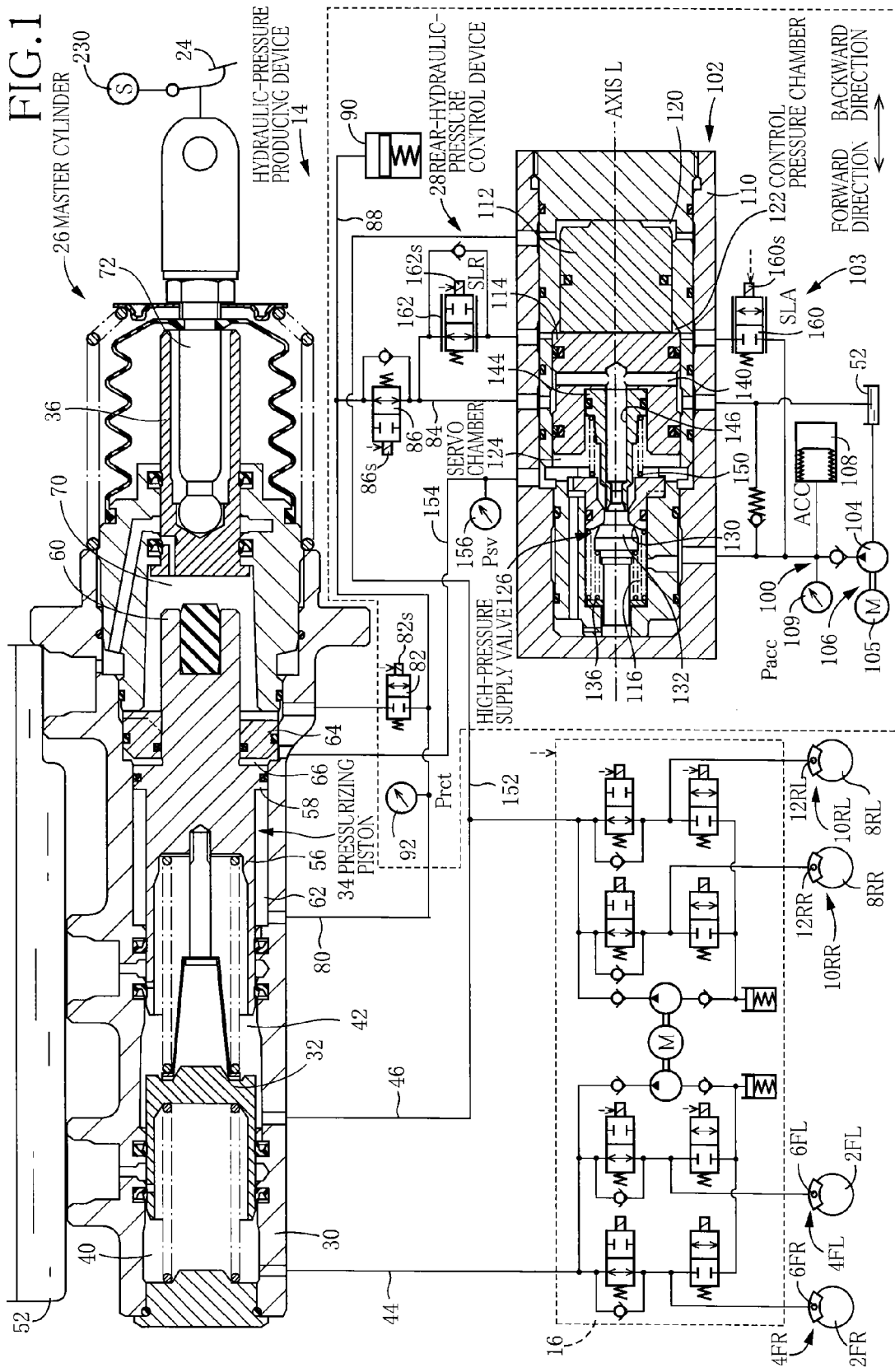

HYDRAULIC BRAKE SYSTEM AND HYDRAULIC PRESSURE CONTROLLER

CROSS REFERENCE TO RELATED APPLICATION

The present application claims priority from Japanese Patent Application No. 2013-144683, which was filed on Jul. 10, 2013, the disclosure of which is herein incorporated by reference in its entirety.

BACKGROUND OF THE INVENTION

Field of the Invention

The present invention relates to a hydraulic brake system including a regulator.

Description of the Related Art

Patent Document 1 discloses a hydraulic brake system including a regulator operable by any one of a hydraulic pressure in a pressure chamber of a master cylinder and a control pressure controlled by a linear valve device. In the present hydraulic brake system, the regulator is normally operated by the control pressure to supply an output hydraulic pressure to a brake cylinder, but in the event of a malfunction, the regulator is operated by the hydraulic pressure in the pressure chamber of the master cylinder to supply the output hydraulic pressure to a rear chamber of the master cylinder.

Patent Document 2 discloses a hydraulic brake system including a regulator operable by a hydraulic pressure in a reaction force chamber of a master cylinder to supply an output hydraulic pressure to a rear chamber of the master cylinder. In the present hydraulic brake system, in a case where regenerative cooperative control is not executed or there is a failure in a power source, the magnitude of the output hydraulic pressure produced by the regulator depends on the hydraulic pressure in the reaction force chamber. In a case where the regenerative cooperative control is executed, however, a linear valve device is controlled to reduce the output hydraulic pressure produced by the regulator.

Patent Document 1: Japanese Patent Application Publication No. 2013-043489

Patent Document 2: Japanese Patent Application Publication No. 2011-235721

SUMMARY OF THE INVENTION

This invention has been developed to improve a hydraulic braking system with a regulator, for example, to enable detection of an operating state of the regulator.

The present invention provides a hydraulic brake system including: a regulator operable by at least one of a hydraulic pressure produced by a master cylinder and a control pressure controlled electrically; and a detector configured to, based on an output hydraulic pressure produced by the regulator, detect that the regulator is in a state in which the regulator is operated by at least the hydraulic pressure produced by the master cylinder.

The regulator is in most cases controlled such that the control pressure is adjusted to a target value determined based on an operating state of a brake operating member (which can be represented by at least one of an operating stroke and an operating force, for example). However, in a case where the brake operating member is operated at a relatively high speed, for example, the hydraulic pressure produced by the master cylinder increases before the control pressure reaches the target value due to, e.g., a delay in control. This situation may establish a state (hereinafter may be referred to as "master-pressure operating state") in which the regulator is operated by the hydraulic pressure produced by the master cylinder or both of the hydraulic pressure produced by the master cylinder and the control pressure. As a result, the output hydraulic pressure produced by the regulator is made larger than that produced in a state (hereinafter may be referred to as "control-pressure operating state") in which the regulator is operated by the control pressure. It is noted that the control-pressure operating state is a state in which the hydraulic pressure produced by the master cylinder does not affect the output hydraulic pressure.

In view of the above, it is possible to recognize that the regulator is in the master-pressure operating state, based on the output hydraulic pressure produced by the regulator.

FORMS OF THE INVENTION

There will be described by way of examples inventions recognized to be claimable by the present applicant or features of the inventions.

(1) A hydraulic brake system, comprising:

a master cylinder comprising at least one pressurizing piston;

a plurality of brake cylinders provided respectively for a plurality of hydraulic brakes which are operated by a hydraulic pressure in at least one front pressure chamber respectively defined in front of the at least one pressurizing piston; and a rear-hydraulic pressure controller connected to a rear chamber defined at a rear of one of the at least one pressurizing piston, the rear-hydraulic pressure controller being configured to control a hydraulic pressure in the rear chamber, the rear-hydraulic pressure controller comprising:

a regulator operable by at least one of the hydraulic pressure in at least one of the at least one front pressure chamber and a control pressure controlled electrically, the regulator being configured to supply an output hydraulic pressure to the rear chamber; and a master-pressure-operating-state detector configured to, when the output hydraulic pressure is greater than a determination threshold value, detect that the regulator is in a master-pressure operating state in which the regulator is operated by at least the hydraulic pressure in the at least one of the at least one front pressure chamber.

In the hydraulic brake system in the present form, the output hydraulic pressure is compared with the determination threshold value to detect whether the regulator is in the master-pressure operating state or not, but this invention is not limited to such direct comparison between the output hydraulic pressure and the determination threshold value. For example, the detection can be carried out by comparing (i) a hydraulic pressure being in a one-to-one correspondence with the output hydraulic pressure and (ii) a threshold value being in a one-to-one correspondence with the determination threshold value. The output hydraulic pressure (or the hydraulic pressure being in a one-to-one correspondence with the output hydraulic pressure) may be any of a hydraulic pressure directly measured by a device such as a sensor and a hydraulic pressure estimated on the basis of a value of the sensor, for example.

The determination threshold value may be any of a predetermined value and a value determined as needed. Also, the determination threshold value may be any of a value which changes with a lapse of time and a value which does not change with a lapse of time. In the case where the determination threshold value is a predetermined value, the value may be determined in advance.

In the master-pressure operating state, the output hydraulic pressure is usually higher than that in the control-pressure operating state. Accordingly, the determination threshold value may be a value which is determined based on a maximum value of hydraulic pressure that can be output in the control-pressure operating state (e.g., a value which is determined by an ability of the rear-hydraulic pressure controller, for example).

(2) The hydraulic brake system according to the above form (1), wherein the master-pressure-operating-state detector comprises a continuation detector configured to detect that the regulator is in the master-pressure operating state, when a state in which the output hydraulic pressure is greater than the determination threshold value has continued for a time that is equal to or greater than a determination time.

One example of the determination time is a length of time which is rarely affected by, e.g., noises that cause misdetection that the regulator is in the master-pressure operating state. Since a condition used for the detection is that the output hydraulic pressure is greater than the determination threshold value for the determination time as described above, it is possible to accurately detect that the regulator is in the master-pressure operating state.

(3) The hydraulic brake system according to the above form (1) or (2), wherein the master-pressure-operating-state detector comprises a threshold value determiner configured to determine the determination threshold value based on a target value of the output hydraulic pressure.

In the regulator, the output hydraulic pressure is usually controlled so as to be brought closer to the target value.

Accordingly, the determination threshold value may be a value which is determined based on the target value. For example, the determination threshold value may be a value which is greater in a case where the target value is large than in a case where the target value is small.

(4) The hydraulic brake system according to the above form (2) or (3), wherein the determination threshold value is a value which increases with a lapse of time during the determination time.

At a start of operation on the hydraulic brake or at a start of increase in the hydraulic pressure in the brake cylinder, for example, the control pressure in the regulator usually increases with a lapse of time, and the output hydraulic pressure usually increases with increase in the control pressure. Accordingly, in a case where the determination threshold value is set at a value which increases with a lapse of time, it is possible to detect that the regulator is in the master-pressure operating state.

For example, the determination threshold value may be a value which increases during an initial time which will be described below and may be a value which increases for a length of time slightly longer than the determination time from a start of operation of the brake operating member. This is because the output hydraulic pressure often becomes higher than the determination threshold value immediately after the start of operation of the brake operating member.

It is noted that the determination threshold value may be determined based on a change in the output hydraulic pressure in a case where pressure increasing control is executed for the control pressure with a maximum gradient determined by the ability and so on of the rear-hydraulic pressure controller (i.e., based on a changed in the output hydraulic pressure in the control-pressure operating state).

(5) The hydraulic brake system according to any one of the above forms (1) through (4), wherein the at least one pressurizing piston is capable of moving forward due to an operation of a driver for moving a brake operating member forward, and wherein the master-pressure-operating-state detector comprises an operating-state-based detector configured to detect that the regulator is in the master-pressure operating state, in at least one of a case where an operating speed of the brake operating member is greater than a predetermined speed and a case where an operating force applied to the brake operating member is greater than a predetermined operating force.

In at least one of the case where the operating speed of the brake operating member in the forward direction is greater than the predetermined speed and the case where the operating force is greater than the predetermined operating force, the regulator is usually made in the master-pressure operating state because of a possibility that an increase in the control pressure is delayed in the regulator, and thereby the hydraulic pressure produced by the master cylinder becomes greater than the control pressure. For example, the master-pressure operating state is often established in a control transient state such as an initial period of an operation of the brake operating member and an initial period from a start of increase in an amount of operation of the brake operating member.

(6) The hydraulic brake system according to any one of the above forms (1) through (5), wherein the at least one pressurizing piston is capable of moving forward due to an operation of a driver for moving a brake operating member forward, and wherein the master-pressure-operating-state detector comprises an initial period detector configured to detect whether the regulator is in the master-pressure operating state, over an initial time starting from a point in time when a state of the brake operating member is switched from a non-operated state to an operated state.

The initial time may be set at a length of time in which there is a high possibility of establishment of the master-pressure operating state due to a delay in change of the control pressure, for example. In other words, it is considered that the master-pressure operating state is established not frequently after the initial time passes from the start of operation.

Whether the brake operating member is in the operated state or not can be detected by devices such as a stroke sensor, an operating-force sensor, and a brake switch, for example.

(7) The hydraulic brake system according to any one of the above forms (1) through (6), wherein the regulator comprises:

two pistons arranged in a row in an axial direction thereof a control pressure chamber defined at a rear of one piston of the two pistons;

an output chamber defined in front of the one piston; and a master pressure chamber which is defined at a rear of another piston of the two pistons and to which the hydraulic pressure in the at least one of the at least one front pressure chamber is supplied, and wherein the control pressure is a hydraulic pressure in the control pressure chamber, and the output hydraulic pressure is a hydraulic pressure in the output chamber.

In the control-pressure operating state, the hydraulic pressure in the control pressure chamber moves the one piston forward to output the output hydraulic pressure. The output hydraulic pressure is controlled to have a magnitude related to the control pressure.

In the master-pressure operating state, the hydraulic pressure produced by the master cylinder moves said another piston, i.e., the other piston forward. The forward movement of the other piston moves the one piston forward to output the output hydraulic pressure. The two pistons are different components and movable relative to each other in the axial direction. The other piston is a free piston and provided between the control pressure chamber and the pilot pressure chamber so as to be moved by the hydraulic pressures in these chambers.

(8) The hydraulic brake system according to the above form (7), wherein a pressure receiving area of said another piston with respect to the master pressure chamber is less than a pressure receiving area of said another piston which corresponds to the control pressure chamber.

The pressure receiving area with respect to the master pressure chamber (a master-pressure receiving area Sm) is smaller than the pressure receiving area with respect to the control pressure chamber (a control-pressure receiving area Se) (Sm<Se). Accordingly, in a case where the hydraulic pressure Pm in the front pressure chamber and the control pressure Ps are substantially equal to each other, it is possible to make it harder for the other piston to move forward.

On the other hand, even in the case where the master-pressure receiving area Sm and the control-pressure receiving area Se are substantially equal to each other, when the hydraulic pressure Pm in the front pressure chamber and the control pressure Ps are substantially equal to each other, the balance in most cases inhibits the other piston from moving forward. In the case where the master-pressure receiving area Sm is made smaller than the control-pressure receiving area Se, however, it is possible to make it much harder for the other piston to move forward.

(9) The hydraulic brake system according to any one of the above forms (1) through (8), wherein the master cylinder comprises an input piston engaged with a brake operating member operable by a driver, and input piston is provided at a rear of a transmitter capable of transmitting a forward movement force to the one pressurizing piston, with an input chamber being interposed between the input piston and the transmitter.

In a case where a normal operation is performed on the brake operating member (i.e., in at least one of the case where the operating speed is equal to or lower than the predetermined speed and the case where the operating force is equal to or smaller than the predetermined value), the hydraulic pressure in the rear chamber moves the pressurizing piston forward relative to the input piston. The pressurizing piston and the input piston are never brought into contact with each other, keeping the pressurizing piston and the input piston spaced apart from each other.

In contrast, in a case where the operating speed of the brake operating member is large, for example, the input piston is brought into contact with the pressurizing piston in the master cylinder, resulting in generation of a hydraulic pressure in the front pressure chamber. While the hydraulic pressure in the front pressure chamber which acts on the regulator increases, an increase in the control pressure is delayed due to a delay in control. This results in forward movement of the other piston, thereby moving the one piston forward. The magnitude of the output hydraulic pressure becomes a magnitude which is determined based on the sum of the control pressure applied to the one piston and the hydraulic pressure in the front pressure chamber which is applied to the other piston (in some cases, the control pressure is zero), and this output hydraulic pressure becomes higher than that in its normal state.

When the increase in the output hydraulic pressure has increased the hydraulic pressure in the rear chamber in the master cylinder, the pressurizing piston is moved forward relative to the input piston, moving the pressurizing piston away from the input piston. The operating force acting on the pressurizing piston is removed, and thereby the hydraulic pressure in the front pressure chamber decreases, resulting in decrease in the hydraulic pressure in the brake cylinder. Also, while the hydraulic pressure in the front pressure chamber which acts on the other piston decreases in the regulator, the control pressure increases, so that the other piston is moved backward. Until the other piston reaches its back end position, an amount of increase in the control pressure is reduced, resulting in reduction in amount of increase in the output hydraulic pressure. When the other piston reaches the back end position, the tendency of the control pressure is changed to a substantially constant tendency to an increasing tendency (hereinafter this change may be simply referred to as "the tendency is changed to the increasing tendency"), which changes the tendency of the output hydraulic pressure to an increasing tendency. The hydraulic pressure in the brake cylinder is kept and thereafter increased.

If the master-pressure operating state of the regulator is established, some problems may occur such as deteriorated brake feeling and a delay in brake response of the hydraulic brake. To address these problems, the detection of the master-pressure operating state is effective.

(10) The hydraulic brake system according to the above form (9), wherein the pressurizing piston comprises a first piston portion and a second piston portion, wherein a space in front of the second piston portion is the at least one front pressure chamber, wherein a space in front of a step between the first piston portion and the second piston portion is an annular chamber connected to the input chamber, and wherein a space at a rear of the first piston portion is the rear chamber.

When the hydraulic pressure in the rear chamber which acts on the pressurizing piston has increased, and thereby the pressurizing piston is moved forward relative to the input piston, working fluid flows from the annular chamber to the input chamber, also facilitating the movement of the input piston and the pressurizing piston away from each other. The first piston portion and the second piston portion may constitute a large diameter portion and a small diameter portion, respectively.

(11) The hydraulic brake system according to any one of the above forms (1) through (10), wherein the rear-hydraulic pressure controller comprises a switch controller configured to, when the master-pressure-operating-state detector has detected that the regulator is in the master-pressure operating state, execute switch control in which a state of the regulator is switched from the master-pressure operating state to a control-pressure operating state in which the regulator is operated by the control pressure.

The switch control is started at a point in time when it is detected that the regulator is in the master-pressure operating state and is finished at a point in time when it is detected that the state of the regulator is switched to the control-pressure operating state.

While normal control in which the control pressure is controlled such that the output hydraulic pressure is brought closer to a target hydraulic pressure is executed in the control-pressure operating state, the switch control differs from this normal control. It is possible to consider that the switch control is control for switching the state of the regulator to the control-pressure operating state before a lapse of a set length of time from the detection of the master-pressure operating state. The set length of time (which may be referred to as "switch time") may be a time which is shorter than a time required for switch to the control-pressure operating state in a case where the normal control is continued.

(12) The hydraulic brake system according to the above form (11), wherein the switch controller is configured to complete the switch control when it is detected that the state of the regulator has been switched to the control-pressure operating state.

For example, it is possible to consider that the state of the regulator has been switched to the control-pressure operating state in a case where the output hydraulic pressure has been changed from a substantially constant state to an increasing tendency. When the other piston is moved to its back end position, the control pressure is changed to an increasing tendency, and accordingly the output hydraulic pressure is changed to the increasing tendency. It can be determined that the output hydraulic pressure has been changed to the increasing tendency in a case where a current value of the output hydraulic pressure is greater than a preceding value by equal to or greater than a set value.

(13) The hydraulic brake system according to the above form (11) or (12), wherein the switch controller is configured to execute the switch control until the output hydraulic pressure changes from a substantially constant state to an increasing tendency.

For example, it is possible to determine that the output hydraulic pressure has been changed to the increasing tendency when a value $\{(dPo(n)/dt)-(dPo(n-1)/dt)\}$ obtained by subtracting a preceding value of an increase gradient (dPo/dt) of an output hydraulic pressure Po with respect to a time from a current value thereof becomes equal to or greater than a set value. In other words, it is possible to determine that the output hydraulic pressure has been changed to the increasing tendency when the derivative value has been changed from a value smaller than a positive set value, to a value equal to larger than the set value. The substantially constant state is a state in which the tendency of the hydraulic pressure is not recognized as the increasing tendency. The substantially constant state includes a state in which the hydraulic pressure decreases and a state in which the hydraulic pressure changes within a predetermined range.

(14) The hydraulic brake system according to any one of the above forms (11) through (13), wherein the regulator comprises a pilot piston configured to receive the hydraulic pressure in the at least one of the at least one front pressure chamber from a rear side of the pilot piston, and wherein the switch controller is configured to execute the switch control at a point in time when the pilot piston is moved to a back end position.

(15) The hydraulic brake system according to any one of the above forms (11) through (14), wherein the rear-hydraulic pressure controller comprises:

an electromagnetic valve connected to the control pressure chamber and capable of controlling a flow rate of working fluid allowed to flow into the control pressure chamber; and a normal controller configured to control the electromagnetic valve in a control-pressure operating state in which the regulator is operated by the control pressure, to control the control pressure such that the output hydraulic pressure is brought closer to a target value, and wherein the switch controller comprises a flow rate controller configured to control the electromagnetic valve such that the flow rate is greater in the control executed by the switch controller than in the control executed by the normal controller.

For example, even where a deviation between the target value and an actual value is the same, the working fluid is allowed to flow into the control pressure chamber at a greater flow rate in the switch control than in the normal control (noted that control executed by the normal controller in the control-pressure operating state is hereinafter referred to simply as "normal control"). Accordingly, the state of the regulator can be quickly switched to the control-pressure operating state.

(16) The hydraulic brake system according to the above form (15), wherein the switch controller comprises a flow rate determiner configured to determine a flow rate of working fluid to flow into the control pressure chamber.

The flow rate may be a predetermined value and may be a value determined as needed, for example. The flow rate may be determined based on a value obtained by dividing an amount of working fluid required for the other piston (i.e., a pilot piston) of the regulator to be moved to the back end position (i.e., an amount of change in the volume of the control pressure chamber) by a target time for switching the regulator to the control-pressure operating state (noted that this target time may be the switch time described in the explanation for the form (11)). A short target time is preferable, but an excessively short target time is not preferable in some cases.

(17) The hydraulic brake system according to any one of the above forms (11) through (16), wherein the rear-hydraulic pressure controller comprises an electromagnetic valve provided between the control pressure chamber and a high pressure source capable of supplying working fluid of a high pressure, wherein the electromagnetic valve is a flow-rate control valve configured to make the flow rate of working fluid allowed to flow into the control pressure chamber, greater in a case where an amount of current supplied to a coil of the electromagnetic valve is large than in a case where the amount of current supplied to the coil of the electromagnetic valve is small, and wherein the switch controller comprises a supply current controller configured to supply a greater amount of current to the coil of the electromagnetic valve in the control executed by the switch controller than in the control executed by the normal controller.

(18) A hydraulic brake system, comprising:

a master cylinder comprising at least one pressurizing piston movable forward due to an operation of a brake operating member operable by a driver;

a plurality of brake cylinders provided respectively for a plurality of hydraulic brakes which are operated by a hydraulic pressure in at least one front pressure chamber respectively defined in front of the at least one pressurizing piston; and a rear-hydraulic pressure controller connected to a rear chamber defined at a rear of one of the at least one pressurizing piston, the rear-hydraulic pressure controller being configured to control a hydraulic pressure in the rear chamber, the rear-hydraulic pressure controller comprising:

a regulator operable by at least one of the hydraulic pressure in at least one of the at least one front pressure chamber and a control pressure controlled electrically, the regulator being configured to supply an output hydraulic pressure to the rear chamber; and a master-pressure-operating-state detector configured to, based on at least one of an operating speed of the brake operating member and the output hydraulic pressure, detect that the regulator is in a master-pressure operating state in which the regulator is operated by at least the hydraulic pressure in the at least one of the at least one front pressure chamber.

The hydraulic brake system in the present form can adapt any of the technical features in the forms (1) through (17).

(19) A hydraulic brake system, comprising:

a master cylinder comprising at least one pressurizing piston;

a plurality of brake cylinders provided respectively for a plurality of hydraulic brakes which are operated by a hydraulic pressure in at least one front pressure chamber respectively defined in front of the at least one pressurizing piston; and a rear-hydraulic pressure controller connected to a rear chamber defined at a rear of one of the at least one pressurizing piston, the rear-hydraulic pressure controller being configured to control a hydraulic pressure in the rear chamber, the rear-hydraulic pressure controller comprising:

a regulator operable by at least one of the hydraulic pressure in at least one of the at least one front pressure chamber and a control pressure controlled electrically, the regulator being configured to supply an output hydraulic pressure to the rear chamber; and a switch controller configured to, when the regulator is in a master-pressure operating state in which the regulator is operated by at least the hydraulic pressure in the at least one of the at least one front pressure chamber, switch a state of the regulator from the master-pressure operating state to a control-pressure operating state in which the regulator is operated by the control pressure.

The hydraulic brake system in the present form can adapt any of the technical features in the forms (1) through (17).

(20) A hydraulic pressure controller, comprising:

a regulator configured to control an output hydraulic pressure by being operated by at least one of a pilot pressure and a control pressure controlled electrically; and a pilot-pressure operating state detector configured to detect, based on the output hydraulic pressure, whether the regulator is in a pilot-pressure operating state in which the regulator is operated by at least the pilot pressure.

For example, the pilot-pressure operating state detector may be configured to detect whether the regulator is in the pilot-pressure operating state or not, based on an increase gradient of the output hydraulic pressure. Specifically, the pilot-pressure operating state detector may be configured to detect that the regulator is in the pilot-pressure operating state, when the increase gradient of the output hydraulic pressure is larger than a determination gradient threshold value.

The regulator is originally operated by the control pressure, and the magnitude of its output hydraulic pressure is determined by the control pressure generated in a case where the regulator is in a control-pressure operating state. When the regulator is operated by the pilot pressure, in contrast, the magnitude of the output hydraulic pressure becomes different from the magnitude (hereinafter may be referred to as "control-pressure corresponding value") determined by the control pressure generated in the case where the regulator is in the control-pressure operating state. That is, the output hydraulic pressure may be larger or smaller than the control-pressure corresponding value by the operation of the regulator in the pilot-pressure operating state. In view of the above, in a broad sense, the pilot-pressure operating state means a state in which the output hydraulic pressure differs from the control-pressure corresponding value in magnitude, and in a narrow sense, the pilot-pressure operating state means a state in which the output hydraulic pressure is larger than the control-pressure corresponding value or a state in which the output hydraulic pressure is larger than the control-pressure corresponding value and is increasing.

The hydraulic pressure controller in the present form can adapt any of the technical features in the forms (1) through (19). In a case where the hydraulic pressure controller is employed for the hydraulic brake system, the pilot pressure may be the hydraulic pressure produced by the master cylinder. The hydraulic pressure produced by the master cylinder is a hydraulic pressure generated by an operation of the brake operating member. Pressures which may be used as this hydraulic pressure produced by the master cylinder include: a hydraulic pressure in the front pressure chamber defined in front of the pressurizing piston; and a hydraulic pressure in the input chamber defined in front of the input piston engaged with the brake operating member. In this sense, the pilot pressure may be referred to as "manual pressure". Furthermore, the hydraulic brake system may be configured such that the output hydraulic pressure produced by the regulator is supplied to the rear chamber of the master cylinder or to the brake cylinder, for example.

(21) A hydraulic pressure controller, comprising:

a regulator configured to control an output hydraulic pressure by being operated by at least one of a pilot pressure and a control pressure controlled electrically; and an operating-state switch controller configured to, when the output hydraulic pressure is greater than a determination threshold value, execute switch control to switch a state of the regulator to a control-pressure operating state in which the regulator is operated by the control pressure.

The hydraulic pressure controller in the present form can adapt any of the technical features in the forms (1) through (19).

BRIEF DESCRIPTION OF THE DRAWINGS

The objects, features, advantages, and technical and industrial significance of the present invention will be better understood by reading the following detailed description of the embodiments of the invention, when considered in connection with the accompanying drawings, in which:

FIG. 1 is a circuit diagram illustrating a hydraulic brake system according a first embodiment of the present invention;

FIG. 7 is a view for explaining the problem to be solved by the present invention;

DETAILED DESCRIPTION OF THE EMBODIMENTS

Figure 2A:
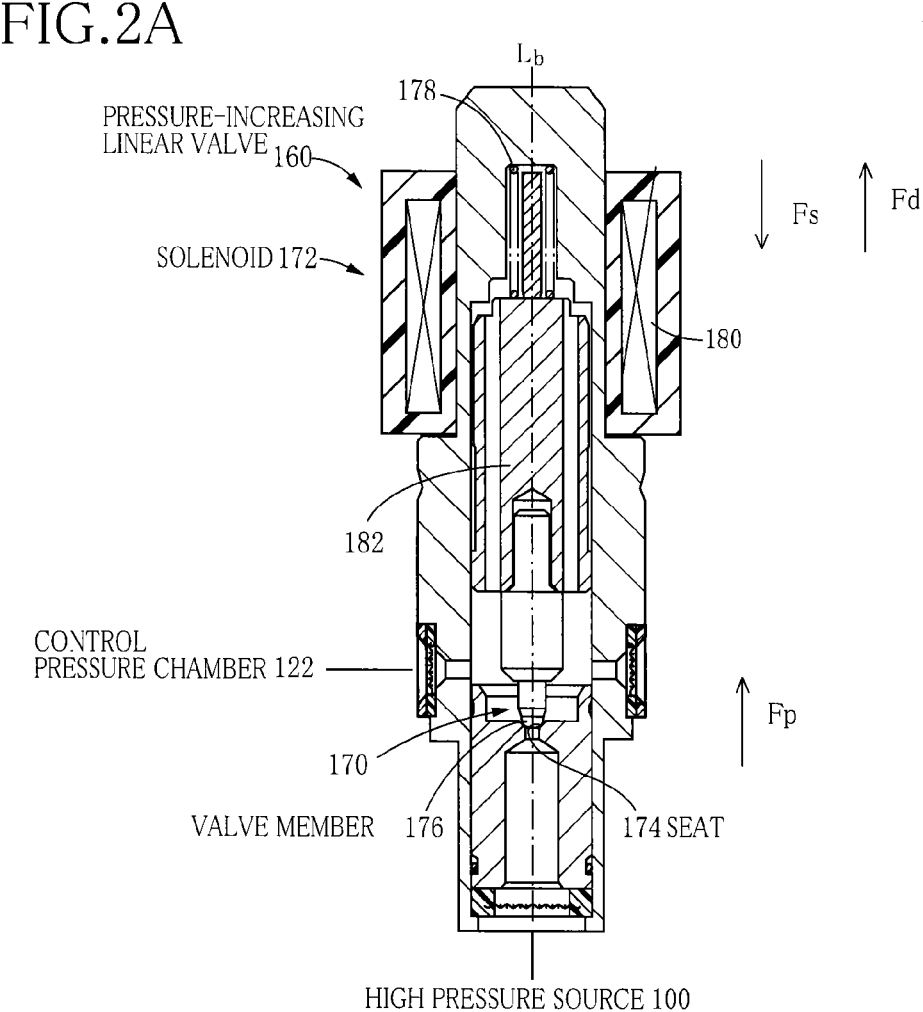
FIG. 2A is a cross-sectional view illustrating a pressure-increasing linear valve of the hydraulic brake system.

Hereinafter, there will be explained a hydraulic brake system according to one embodiment of the present invention by reference to the drawings. The present hydraulic brake system executes electrical control for generating a desired magnitude of braking force in each hydraulic brake. The present hydraulic brake system includes a hydraulic pressure controller as one embodiment of the present invention.

<First Embodiment>

Configuration of Hydraulic Brake System

As illustrated in FIG. 1, the hydraulic brake system includes (i) brake cylinders 6FL, 6FR of hydraulic brakes 4FL, 4FR respectively provided for front left and right wheels 2FL, 2FR, and brake cylinders 12RL, 12RR of hydraulic brakes 10RL, 10RR respectively provided for rear left and right wheels 8RL, 8RR, (ii) a hydraulic-pressure producing device 14 capable of supplying hydraulic pressures to these brake cylinders 6FL, 6FR, 12RL, 12RR, and (iii) a slip control device provided between the hydraulic-pressure producing device 14 and the brake cylinders 6FL, 6FR, 12RL, 12RR. Devices such as the hydraulic-pressure producing device 14 and the slip control device 16 are controlled by a brake ECU 20 (see FIG. 3) constituted mainly by a computer.

Hydraulic-Pressure Producing Device

The hydraulic-pressure producing device 14 includes (i) a brake pedal 24 as a brake operating member, (ii) a master cylinder 26, (iii) a rear-hydraulic pressure controller 28 configured to control a hydraulic pressure in a rear chamber of the master cylinder 26.

Master Cylinder

The master cylinder 26 includes (a) a housing 30, (b) pressurizing pistons 32, 34 and an input piston 36 arranged in a row and fluid-tightly and slidably fitted in a cylinder bore formed in the housing 30.

Front pressure chambers 40, 42 are defined in front of the respective pressurizing pistons 32, 34. The brake cylinders 6FL, 6FR of the hydraulic brakes 4FL, 4FR provided for the respective front left and right wheels 2FL, 2FR are connected to the front pressure chamber 40 by a fluid passage 44, while the brake cylinders 12RL, 12RR of the hydraulic brakes 10RL, 10RR provided for the respective rear left and right wheels 8RL, 8RR are connected to the front pressure chamber 42 by a fluid passage 46. The hydraulic pressures supplied to the brake cylinders 6FL, 6FR, 12RL, 12RR actuate the respective hydraulic brakes 4FL, 4FR, 10RL, 10RR to restrain rotations of the respective wheels 2FL, 2FR, 8RL, 8RR.

In the following description, where the distinction of wheels is not required, each of devices such as the hydraulic brakes and electromagnetic valves which will be described below may be referred without suffixes (FL, FR, RL, RR) indicative of the corresponding wheels.

Return springs are respectively provided between the pressurizing piston 32 and the housing 30 and between the two pressurizing pistons 32, 34 to urge the pressurizing pistons 32, 34 backward. When the pressurizing pistons 32, 34 are located at their respective back end positions, the front pressure chambers 40, 42 are in communication with a master reservoir 52.

The pressurizing piston 34 includes (a) a front piston portion 56 provided in a front portion thereof, (b) an intermediate piston portion 58 provided in an intermediate portion of the pressurizing piston 34 so as to project in its radial direction, and (c) a rear small-diameter portion 60 provided in a rear portion of the pressurizing piston 34 and having a smaller diameter than the intermediate piston portion 58. The front piston portion 56 and the intermediate piston portion 58 are fluid-tightly and slidably fitted in the housing 30. A space in front of the front piston portion 56 is the front pressure chamber 42, and a space in front of the intermediate piston portion 58 is an annular chamber 62.

The housing 30 is provided with an annular inner-circumferential-side protruding portion 64, and the rear portion of the intermediate piston portion 58, i.e., the rear small-diameter portion 60 is fluid-tightly and slidably fitted in the inner-circumferential-side protruding portion 64. As a result, a rear chamber 66 is formed at a rear of the intermediate piston portion 58 and between the intermediate piston portion 58 and the inner-circumferential-side protruding portion 64.

It is possible to consider that the front piston portion 56, the intermediate piston portion 58, and other portions constitute a pressurizing piston portion of the pressurizing piston 34 and that the front piston portion 56, the intermediate piston portion 58, and other portions correspond to a pressurizing piston described in the appended claims. Each of the pressurizing piston and the pressurizing piston portion means a component having a function of producing a hydraulic pressure by its forward movement.

The input piston 36 is located at a rear of the pressurizing piston 34, and an input chamber 70 is defined between a transmitter 60 as the rear small-diameter portion and the input piston 36. The brake pedal 24 is engaged with a rear portion of the input piston 36 by an operating rod 72 and other components.

The annular chamber 62 and the input chamber 70 are connected to each other by a passage 80. A communication control valve 82 is provided in the passage 80. The communication control valve 82 is an electromagnetic open/close valve which is opened and closed according to a state of current supplied to a coil 82s, specifically, the communication valve 82 is a normally closed valve which establishes its closed state when no current is supplied to the coil 82s. A portion of the passage 80 which is located on one of opposite sides of the communication control valve 82 which is nearer to the annular chamber 62 is connected to the master reservoir 52 by a reservoir passage 84 in which a reservoir cut-off valve 86 is provided. The reservoir cut-off valve 86 is an electromagnetic open/close valve which is opened and closed according to a state of current supplied to a coil 86s, specifically, the reservoir cut-off valve 86 is a normally open valve which establishes its open state when no current is supplied to the coil 86s.

A stroke simulator 90 is connected, by a simulator passage 88, to the portion of the passage 80 which is located on one of opposite sides of the communication control valve 82 which is nearer to the annular chamber 62. Since the stroke simulator 90 is connected to the input chamber 70 by the simulator passage 88 and the passage 80, operations of the stroke simulator 90 are allowed when the communication control valve 82 is in its open state and are inhibited when the communication control valve 82 is in its closed state. The operations of the stroke simulator 90 are inhibited also when the passage 80 is in communication with the reservoir 52. In view of the above, each of the communication control valve 82 and the reservoir cut-off valve 86 can be considered to serve as a simulator control valve.

A hydraulic sensor 92 is provided in a portion of the passage 80 which is located on one of opposite sides of the portion thereof to which the reservoir passage 84 is connected, and the one of opposite sides is nearer to the annular chamber 62. The hydraulic sensor 92 detects a hydraulic pressure in the annular chamber 62 and the input chamber 70 in a state in which the annular chamber 62 and the input chamber 70 are in communication with each other and isolated from the master reservoir 52. The hydraulic pressure detected by the hydraulic sensor 92 has a magnitude related to an operating force of the brake pedal 24. Accordingly, the hydraulic sensor 92 can be referred to as "operating-force sensor" and "operation-related hydraulic sensor".

Rear-Hydraulic Pressure Controller

The rear-hydraulic pressure controller 28 is connected to the rear chamber 66. The rear-hydraulic pressure controller 28 includes (a) a high pressure source 100, (b) a regulator 102, and (c) a linear valve device 103.

The high pressure source 100 includes: a pump device 106 including a pump 104 and a pump motor 105; and an accumulator 108 configured to accumulate working fluid or brake fluid ejected from the pump device 106 in a pressurized state. A hydraulic pressure of the working fluid accumulated in the accumulator 108 is called an accumulator pressure which is detected by an accumulator pressure sensor 109. The pump motor 105 is controlled so as to keep the accumulator pressure within a predetermined range.

The regulator 102 includes (d) a housing 110, and (e) a pilot piston 112 and a control piston 114 provided in the housing 110 so as to be arranged in a row in a direction parallel to an axis L. The housing 110 has a stepped cylinder bore which includes: a large diameter portion in which the pilot piston 112 and the control piston 114 are fluid-tightly and slidably fitted; and a small diameter portion having a high pressure chamber 116 connected to the high pressure source 100. A space between the pilot piston 112 and the housing 110 is a pilot pressure chamber 120, a space at a rear of the control piston 114 is a control pressure chamber 122, and a space between the control piston 114 and a step between the large diameter portion and the small diameter portion of the cylinder bore is a servo chamber 124. Also, a high-pressure supply valve 126 is provided between the servo chamber 124 and the high pressure chamber 116.

The high-pressure supply valve 126 is a normally closed valve and includes (f) a seat 130, (g) a valve member 132 which can be seated on and moved off the seat 130, and (h) a spring 136 for applying an elastic force onto the valve member 132 in a direction in which the seat 130 is to be seated (i.e., a backward direction).

A central portion of a main body of the control piston 114 has: a mating hole extending parallel to the axis L; and a fluid passage 140 having a portion extending in a direction perpendicular to the axis L (i.e., a radial direction) and communicating with the mating hole. The fluid passage 140 is always in communication with a low pressure port connected to the master reservoir.

A valve opening member 144 extending parallel to the axis L is fitted in the mating hole. The valve opening member 144 has: a central portion in which is formed an axial direction passage 146 extending parallel to the axis L; a rear end portion which opens to the fluid passage 140; and a front end portion which opposes the valve member 132. The low pressure port and the front end opening portion of the valve opening member 144 which opposes the valve member 132 are connected to each other by the axial direction passage 146 and the fluid passage 140.

A spring 150 is provided between the valve opening member 144 and the housing 110 to urge the control piston 114 (having the valve opening member 144) in its backward direction.

It is noted that the pilot pressure chamber 120 is connected to the fluid passage 46 by a pilot passage 152. Thus, a hydraulic pressure in the pressure chamber 42 of the master cylinder 26 acts on the pilot piston 112.

The rear chamber 66 of the master cylinder 26 is connected to the servo chamber 124 by a servo passage 154. Since the servo chamber 124 and the rear chamber 66 are directly connected to each other, a hydraulic pressure in the servo chamber 124 and a hydraulic pressure in the rear chamber 66 are principally equal to each other. It is noted that a servo-hydraulic-pressure sensor 156 is provided in the servo passage 154 to detect a servo hydraulic pressure.

The linear valve device 103 including a pressure-increasing linear valve 160 and a pressure-reduction linear valve 162 is connected to the control pressure chamber 122. A hydraulic pressure in the control pressure chamber 122 is controlled by control of currents supplied to a coil 160s of the pressure-increasing linear valve 160 and a coil 162s of the pressure-reduction linear valve 162. The pressure-increasing linear valve 160 is a normally closed valve which establishes its closed state when no current is supplied to the coil 160s. The pressure-reduction linear valve 162 is a normally open valve which establishes its open state when no current is supplied to the coil 162s.

As illustrated in FIG. 2A, the pressure-increasing linear valve 160 includes a poppet valve portion 170 and a solenoid 172. The poppet valve portion 170 includes: a seat 174 and a valve member 176; and a spring 178 which applies an elastic force Fs in a direction in which the valve member 176 is moved closer to the seat 174. The solenoid 172 includes the coil 160s and a plunger 182 which applies, to the valve member 176, an electromagnetic driving force Fd generated when a current is supplied to the coil 160s. The pressure-increasing linear valve 160 is provided in an orientation in which a pressure differential force Fp related to a hydraulic pressure difference between the high pressure source 100 and the control pressure chamber 122 acts in a direction in which the valve member 176 is moved away from the seat 174.

$$Fp+Fd:Fs$$

Figure 2B:
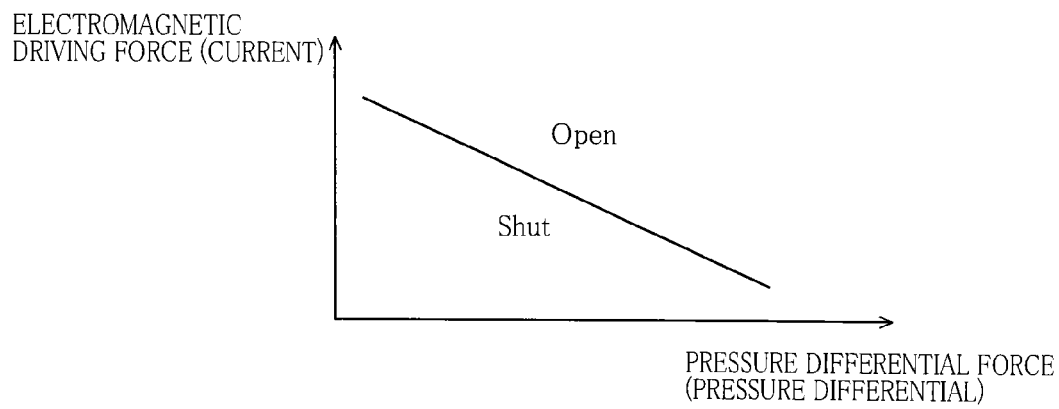
FIG. 2B is a view illustrating a characteristic of the pressure-increasing linear valve.

The state of the pressure-increasing linear valve 160 is switched from the closed state to the open state when the sum of the pressure differential force Fp and the electromagnetic driving force Fd becomes greater than the elastic force Fs of the spring 178. The pressure-increasing linear valve 160 has a characteristic which is a relationship between a valve opening current IopenA and a pressure differential illustrated in FIG. 2B.

Though not shown, the pressure-reduction linear valve 162 is provided in an orientation in which a pressure differential force Fp related to a pressure differential between the control pressure chamber 122 and the master reservoir acts in a direction in which the pressure-reduction linear valve 162 becomes its open state. Also, a spring is provided so as to apply an elastic force in a direction in which the pressure-reduction linear valve 162 becomes the open state. When a current is supplied to the coil 162s, an electromagnetic driving force acts in a direction in which the pressure-reduction linear valve 162 becomes its closed state.

$$Fs+Fp:Fd$$

When the electromagnetic driving force Fd becomes greater than the sum of the pressure differential force Fp and the elastic force Fs of the spring, the state of the pressure-reduction linear valve 162 is switched from the open state to the closed state. When the pressure-reduction linear valve 162 is kept in the closed state, a predetermined seal current Iseal is supplied.

Slip Control Device

The slip control device 16 controls hydraulic pressures in the brake cylinders 6FL, 6FR, 12RL, 12RR by fluidically coupling each of the brake cylinders 6FL, 6FR, 12RL, 12RR selectively with any of the reservoir and a corresponding one of the pressure chambers 40, 42. The slip control device 16 is controlled to individually control the hydraulic pressures in the respective brake cylinders 6FL, 6FR, 12RL, 12RR such that a slip of each of the wheels 2FL, 2FR, 8RL, 8RR falls within a proper range determined by a coefficient of friction of a road surface.

Brake ECU

Figure 3:
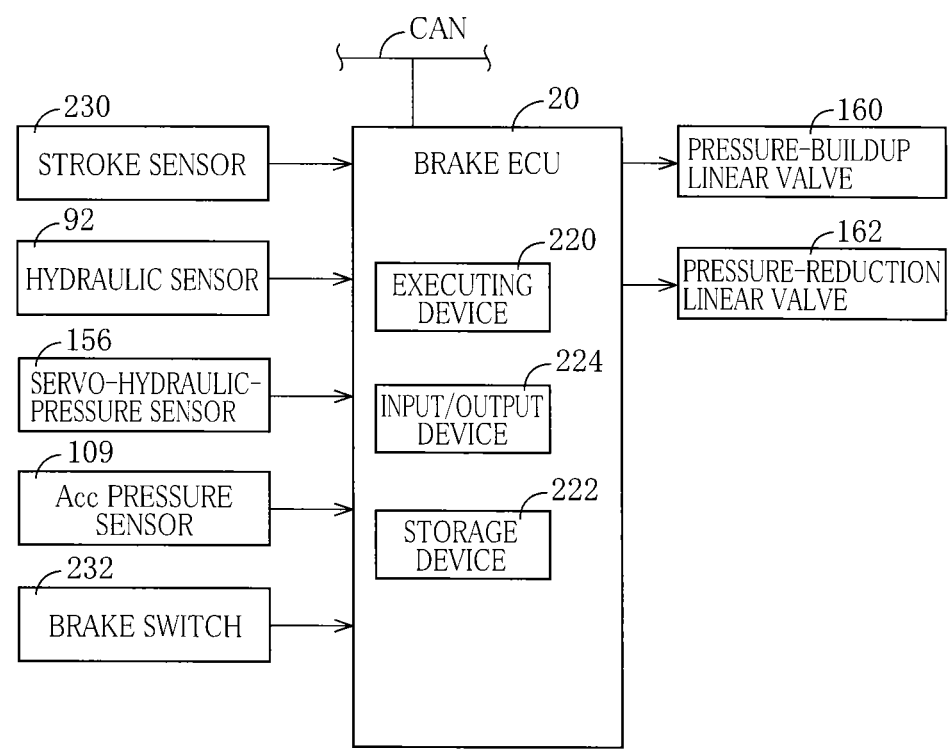
FIG. 3 is a view illustrating a brake ECU and devices connected thereto in the hydraulic brake system.

As illustrated in FIG. 3, the brake ECU 20 is constituted mainly by a computer including an executing device 220, a storage device 222, and an input/output device 224. Devices connected to the input/output device 224 include: the operation-related hydraulic sensor 92; the accumulator pressure sensor 109; the servo-hydraulic-pressure sensor 156; a stroke sensor 230 for detecting a stroke of the brake pedal 24 (hereinafter may be referred to as "operating stroke"); a brake switch 232 for detecting whether the brake pedal 24 is being operated or not; the coils of the electromagnetic valves such as the pressure-increasing linear valve 160 and the pressure-reduction linear valve 162.

The storage device 222 of the brake ECU 20 stores a plurality of programs and tables, for example.

Operations of Hydraulic Brake System

Case where Normal Operation is Performed on Brake Pedal 24

A normal operation is an operation in which an operating speed of the brake pedal 24 (which can be represented by at least one of an increased speed of the operating stroke and an increased speed of the operating force) is lower than a predetermined speed, and an operating force is smaller than a predetermined operating force.

In the master cylinder 26, the communication control valve 82 is in the open state, and the reservoir cut-off valve 86 is in the closed state. The input chamber 70 and the annular chamber 62 are in communication with each other, isolated from the master reservoir 52, and are in communication with the stroke simulator 90. With forward movement of the brake pedal 24, the input piston 36 is moved forward to actuate the stroke simulator 90.

In the rear-hydraulic pressure controller 28, the linear valve device 103 is controlled to increase a hydraulic pressure in the control pressure chamber 122 of the regulator 102. The increased hydraulic pressure in the control pressure chamber 122 moves the control piston 114 forward to close the fluid passage 146, isolating the servo chamber 124 from the master reservoir 52, resulting in increase in the hydraulic pressure in the servo chamber 124. The state of the high-pressure supply valve 126 is switched to the open state, establishing a communication between the servo chamber 124 and the high pressure chamber 116, and the hydraulic pressure in the servo chamber 124 is supplied to the rear chamber 66. A state in which the regulator 102 actuated by the hydraulic pressure in the control pressure chamber 122 in this manner may be hereinafter referred to as "control-pressure operating state" or "control-pressure pressurizing state". In the present embodiment, the hydraulic pressure in the servo chamber 124 corresponds to an output hydraulic pressure, and the hydraulic pressure in the control pressure chamber 122 corresponds to a control pressure.

In the master cylinder 26, the hydraulic pressure is supplied from the regulator 102 to the rear chamber 66 to move the pressurizing piston 34 forward, so that hydraulic pressures are produced in the front pressure chambers 40, 42 and supplied to the brake cylinders 6, 12 to actuate the hydraulic brakes 4, 10.

The area of a pressure receiving surface of the intermediate piston portion 58 which opposes the annular chamber 62 is equal to that of a pressure receiving surface of the rear small-diameter portion 60 which opposes the input chamber 70. In the pressurizing piston 34, a force generated due to a hydraulic pressure in the input chamber 70 is balanced with a force generated due to a hydraulic pressure in the annular chamber 62. Thus, the pressurizing piston 34 is moved forward by a forward movement force generated due to the hydraulic pressure in the rear chamber 66. Each of the hydraulic pressures in the respective front pressure chambers 40, 42 has a magnitude related to the hydraulic pressure in the rear chamber 66.

Normal Control

The linear valve device 103 is controlled so as to generate a braking force requested by a driver (hereinafter may be referred to as "requested braking force").

The requested braking force is determined based on an operating state of the brake pedal 24 (which can be represented by at least one of the operating stroke detected by the stroke sensor 230 and the operating force detected by the operation-related hydraulic sensor 92).

Based on the requested braking force, target hydraulic pressures in the respective brake cylinders 6, 12, i.e., in the respective front pressure chambers 40, 42 are determined, and accordingly a target hydraulic pressure in the rear chamber 66 (which is equal to a target hydraulic pressure in the servo chamber 124) is determined, so that a target hydraulic pressure in the control pressure chamber 122 is determined. The currents supplied to the coil 160s of the pressure-increasing linear valve and the coil 162s of the pressure-reduction linear valve are controlled such that an actual hydraulic pressure in the control pressure chamber 122 is closer to the target hydraulic pressure.

A relationship determined by, e.g., the construction of the master cylinder 26 is established between the hydraulic pressures in the respective front pressure chambers 40, 42 and the hydraulic pressure in the rear chamber 66, and a relationship determined by, e.g., the construction of the regulator 102 is established between the hydraulic pressure in the rear chamber 66 (which is equal to the hydraulic pressure in the servo chamber 124) and the hydraulic pressure in the control pressure chamber 122. Thus, once the target hydraulic pressures in the respective front pressure chambers 40, 42 are determined, the target hydraulic pressure in the control pressure chamber 122 is determined. Also, the actual hydraulic pressure in the control pressure chamber 122 can be determined based on the hydraulic pressure detected by the servo-hydraulic-pressure sensor 156.

Since the linear valve device 103 is connected to the control pressure chamber 122, the actual hydraulic pressure in the control pressure chamber 122 should be controlled so as to be brought closer to the target hydraulic pressure, but the relationship is established between the hydraulic pressure in the control pressure chamber 122 and the hydraulic pressure in the rear chamber 66 as described above, making it possible to consider that an actual hydraulic pressure in the rear chamber 66 is controlled so as to be brought closer to the target hydraulic pressure in the rear chamber 66 and that an actual hydraulic pressure in the servo chamber 124 is controlled so as to be brought closer to the target hydraulic pressure, for example.

In the present embodiment, control is executed such that the hydraulic pressure in the control pressure chamber 122, the hydraulic pressure in the servo chamber 124, and the hydraulic pressures in the respective front pressure chambers 40, 42 are substantially equal to each other. Thus, the following explanation is given, assuming that the linear valve device 103 is controlled such that an actual servo pressure Ps as the actual hydraulic pressure in the servo chamber 124 is brought closer to a target hydraulic pressure (hereinafter may be referred to as "target servo pressure") Pref. In the following explanation, the hydraulic pressure in the servo chamber 124 may be referred to as "servo pressure" without distinction of the actual servo pressure and the target servo pressure.

Figure 4A:
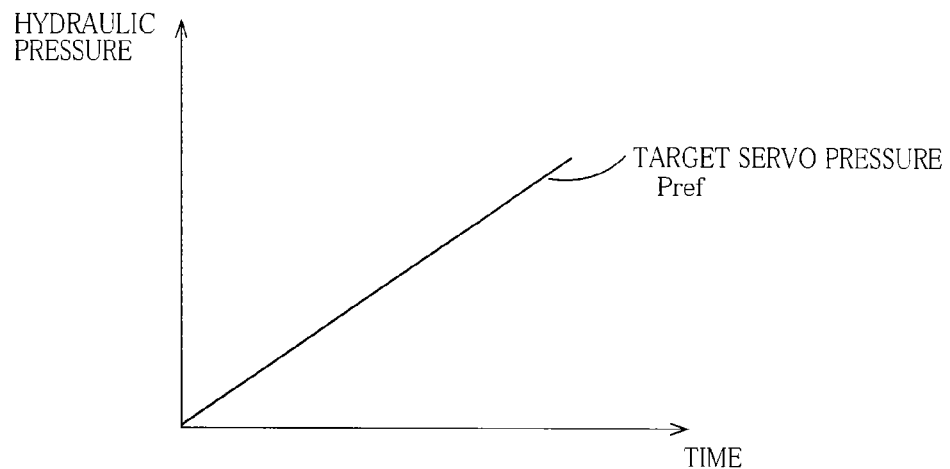
FIGS. 4A-4C are views each illustrating control of a current supplied to a coil of the pressure-increasing linear valve or a pressure-reduction linear valve in the hydraulic brake system.
Figure 4B:
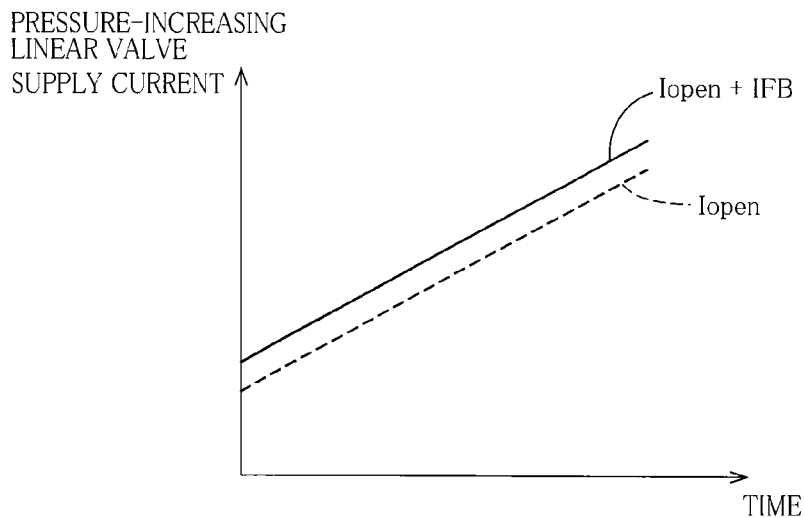

As illustrated in FIG. 4A, for example, the requested braking force is increased in response to operation of the brake pedal 24, increasing the target hydraulic pressures in the respective front pressure chambers 40, 42 and accordingly increasing the target servo pressure Pref. In this case, as illustrated in FIG. 4B, an amount of current supplied to the coil 162s of the pressure-increasing linear valve 160 is increased with the increase in the requested braking force. To the coil 160s of the pressure-increasing linear valve 160 is supplied a current whose magnitude is equal to the sum of (a) a valve opening current Iopen determined based on the relationship illustrated in FIG. 2B and a difference between the hydraulic pressure produced by the high pressure source 100 and the target servo pressure Pref and (b) a feedback current IFB determined according to a deviation between the target servo pressure Pref and the actual servo pressure Ps.

Figure 4C:
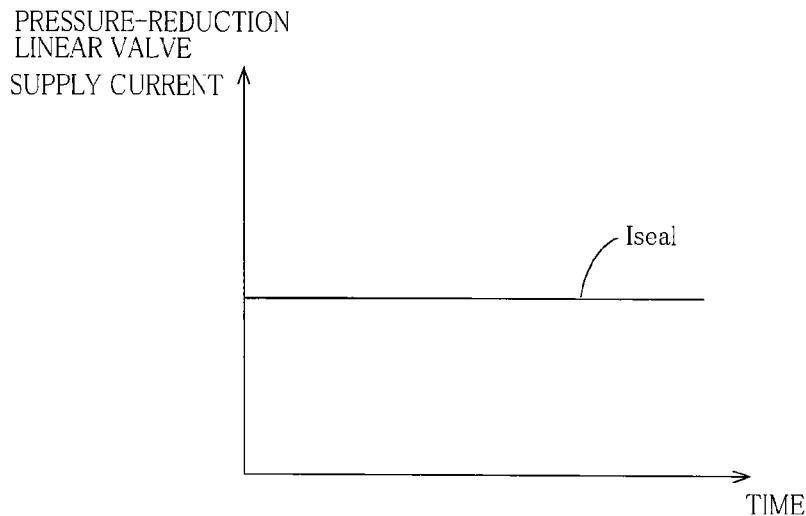

To the coil 162s of the pressure-reduction linear valve 162, on the other hand, the current, i.e., the seal current Iseal, capable of keeping the pressure-reduction linear valve 162 in the closed state is supplied as illustrated in FIG. 4C. Constituted by the normally open valve, the pressure-reduction linear valve 162 requires a relatively large current to keep the pressure-reduction linear valve 162 in the closed state when the control pressure is high, but the magnitude of current supplied to the coil 162s of the pressure-reduction linear valve 162 may be constant. It is noted that the current supplied to the coil 162s of the pressure-reduction linear valve 162 may be determined based on the target servo pressure Pref, for example.

As described above, in the case where the normal operation of the brake pedal 24 is performed, normal control is executed for the respective coils 160s, 162s of the pressure-increasing linear valve 160 and the pressure-reduction linear valve 162. That is, the control pressure as the hydraulic pressure in the control pressure chamber 122 is controlled to control the servo pressure, so that the output hydraulic pressure as the servo pressure is supplied to the rear chamber 66. As a result, the pressurizing piston 34 is moved forward to produce hydraulic pressures in the respective front pressure chambers 40, 42 in relation to the hydraulic pressure in the rear chamber 66.

In the regulator 102, while the hydraulic pressure in the front pressure chamber 40 is supplied to the pilot pressure chamber 120, the hydraulic pressure in the control pressure chamber 122 and a pilot pressure (which is one mode of a master pressure) as the hydraulic pressure in the front pressure chamber 42 are substantially equal to each other in magnitude. Furthermore, a pressure receiving area of the pilot piston 112 for the pilot pressure chamber 120 and a pressure receiving area thereof for the control pressure chamber 122 are substantially equal to each other. Therefore, a forward force generated by the hydraulic pressure in the pilot pressure chamber 120 is balanced with a backward force generated by the hydraulic pressure in the control pressure chamber 122, so that the pilot piston 112 does not move forward. In addition, the movement of the pilot piston 112 is restrained by, e.g., a frictional force between the pilot piston 112 and the housing 110.

Case where Quick and Strong Operation is Performed on Brake Pedal 24

A quick and strong operation is an operation in which the operating speed of the brake pedal 24 (which can be represented by at least one of the increased speed of the operating stroke and the increased speed of the operating force) is equal to or higher than the predetermined speed, and the operating force is equal to or larger than the predetermined operating force. The quick and strong operation can be referred to as "sudden operation".

Upon the quick and strong operation of the brake pedal 24, in the master cylinder 26, the input piston 36 may be quickly moved forward and brought into contact with the pressurizing piston 34 to advance the pressurizing piston 34. Since the increase in the hydraulic pressure in the rear chamber 66 is delayed due to a delay in control of the linear valve device 103 of the regulator 102, the pressurizing piston 34 is moved forward by the input piston 36 before advanced by the hydraulic pressure in the rear chamber 66. In particular, at a start of the operation of the brake pedal 24, currents are started to be supplied to the respective coils 160s, 162s of the pressure-increasing linear valve 160 and the pressure-reduction linear valve 162 from a state in which no current is supplied to the coils 160s, 162s, but the above-described normal control is executed for the supply currents. However, actuations of the pressure-increasing linear valve 160 and the pressure-reduction linear valve 162 are delayed due to delay in increase in the supply currents, for example. This results in delayed increase in the hydraulic pressure in the control pressure chamber 122, causing a delay in increase in the hydraulic pressure in the rear chamber 66.

Figure 5A:
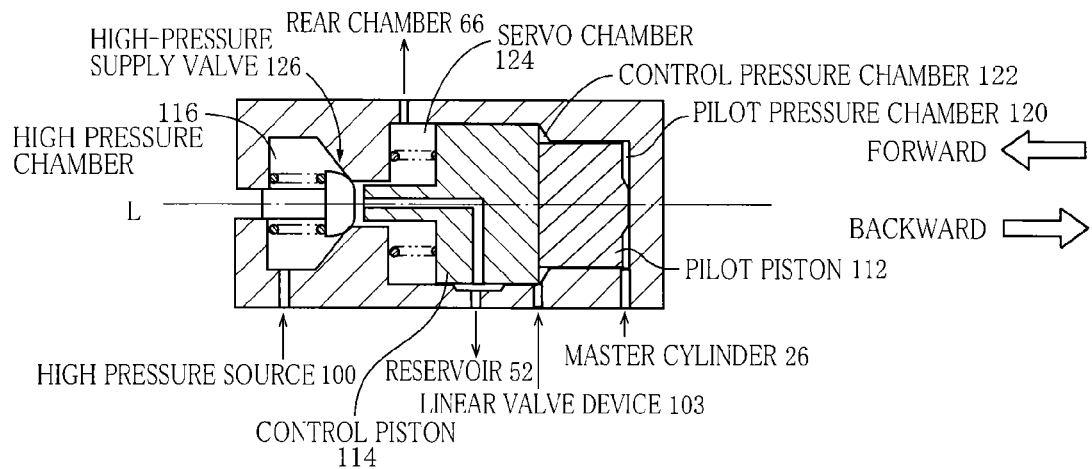
FIGS. 5A-5C are views illustrating operations of a regulator of the hydraulic brake system.
Figure 5B:
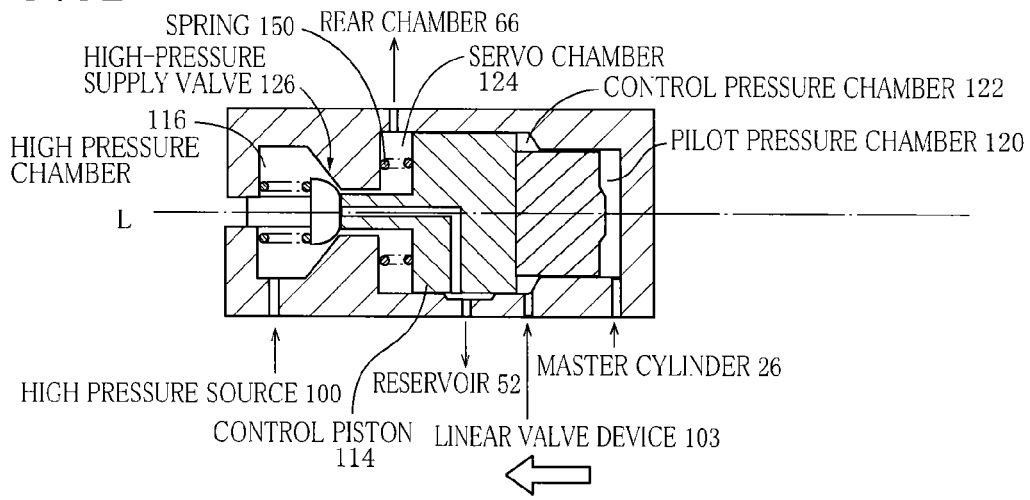

While a hydraulic pressure is produced in the pressure chamber 42 by the forward movement of the pressurizing piston 34 in the master cylinder 26 and supplied to the pilot pressure chamber 120 of the regulator 102, the pilot pressure is higher than the control pressure. Thus, as illustrated in FIG. 5B, the pilot piston 112 is moved forward to advance the control piston 114, resulting in increase in the servo pressure. As indicated by broken line in FIG. 7, the servo pressure is increased with a large gradient. Such a state in which the control piston 114 is moved forward by the pilot pressure or both of the pilot pressure and the control pressure (i.e., a state in which the regulator 102 is operated by the pilot pressure or both of the pilot pressure and the control pressure) can be referred to as "master-pressure operating state", "master-pressure pressurizing state", "pilot-pressure operating state", and "pilot-pressure pressurizing state".

Since the diameter of the control piston 114 is larger than that of the pilot piston 112 in the present embodiment, both of the pilot pressure and the control pressure act on the control piston 114 in the master-pressure operating state (in some cases, the control pressure is approximately zero). In a case where the diameter of the control piston 114 is generally equal to that of the pilot piston 112, however, the control piston 114 is operated by the pilot pressure in the master-pressure operating state.

When an increase in the servo pressure increases the hydraulic pressure in the rear chamber 66, the pressurizing piston 34 is moved forward with respect to the input piston 36 by the hydraulic pressure in the rear chamber 66, that is, the pressurizing piston 34 is moved away from the input piston 36. The working fluid is supplied from the annular chamber 62 to the input chamber 70 with the forward movement of the pressurizing piston 34, facilitating the movement of the input piston 36 and the pressurizing piston 34 away from each other. Also, since the pressurizing piston 34 is moved away from the input piston 36, the operating force applied from the brake pedal 24 to the pressurizing piston 34 is removed, resulting in lower hydraulic pressures in the pressure chambers 40, 42. The pilot pressure acting on the regulator 102 also lowers, thereby lowering the servo pressure as indicated by the broken line in FIG. 7.

Figure 5C:
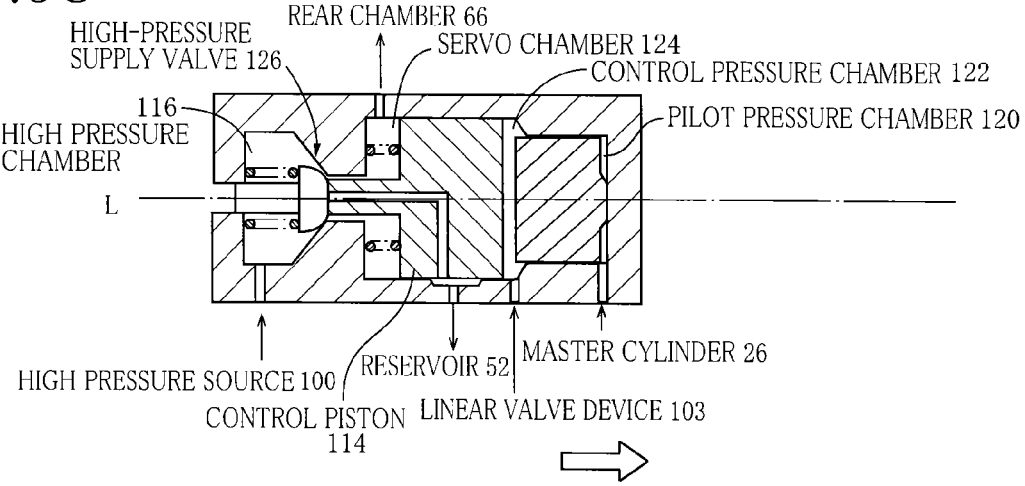

In the normal control, when the control pressure is increased with the increase in the current supplied to the coil 160s of the pressure-increasing linear valve 160 and becomes higher than the pilot pressure, the pilot piston 112 is moved backward as illustrated in FIG. 5C. Until the pilot piston 112 reaches its back end position, the working fluid supplied from the pressure-increasing linear valve 160 is used for increase in the volume of the control pressure chamber 122. Accordingly, as indicated by the broken line in FIG. 7, an amount of the increase in the hydraulic pressure in the control pressure chamber 122 is reduced, which reduces an amount of increase in the hydraulic pressure in the servo chamber 124.

When the pilot piston 112 has reached the back end position, the tendency of the hydraulic pressure in the control pressure chamber 122 is changed to an increasing tendency, and thereby a tendency of the hydraulic pressure in the servo chamber 124 is also changed to an increasing tendency, so that it is considered that the state of the regulator 102 has been switched to the control-pressure operating state. As indicated by the broken line in FIG. 7, the hydraulic pressure in the servo chamber 124 is also increased with the increase in the control pressure. The hydraulic pressure in the rear chamber 66 is also increased, and thereby the hydraulic pressures in the respective front pressure chambers 40, 42 are increased.

Figure 7:
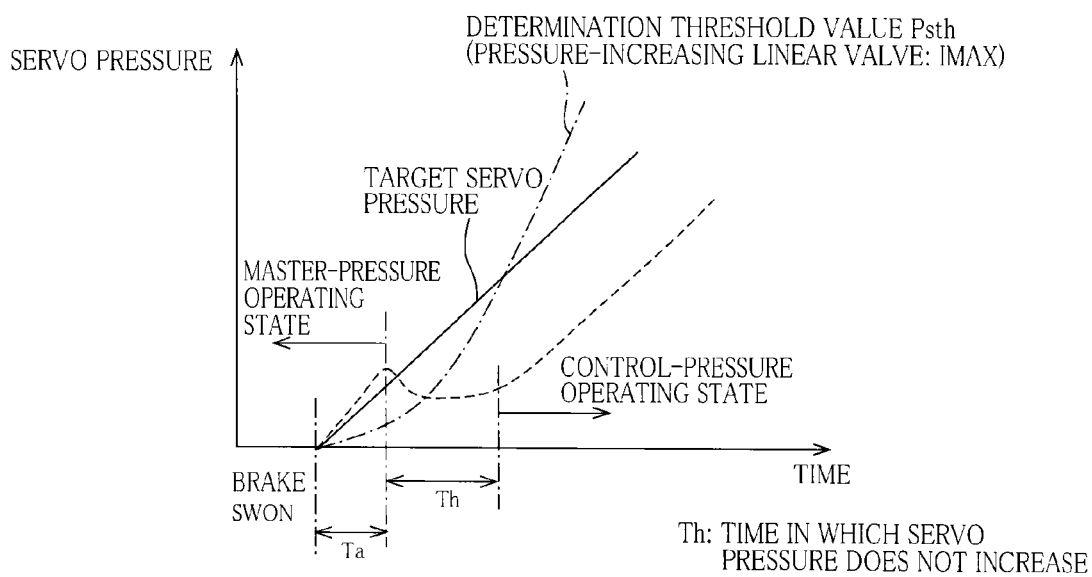
FIG. 7 is a view illustrating changes in a servo pressure in a regulator of a conventional hydraulic brake system, in other words.

As described above, in the case where the quick and strong operation of the brake pedal 24 is performed, the hydraulic pressure in the servo chamber 124 changes as indicated by the broken line in FIG. 7, and the hydraulic pressures in the respective brake cylinders 6, 12 also change as in the hydraulic pressure in the servo chamber 124.

Even in a case where a target braking force is increased linearly, the hydraulic pressures in the respective brake cylinders 6, 12 are increased with a steep gradient, then decreased, then kept at a constant value, and finally increased, resulting in lowered brake feeling. Also, the hydraulic pressures in the respective brake cylinders 6, 12 do not increase in a relatively long period (indicated by time period Th in FIG. 7), causing a delay in brake response in the hydraulic brakes 4, 10.

To address this problem, in the present embodiment, it is possible to detect that the regulator 102 is in the master-pressure operating state, and when it is detected that the regulator 102 is in the master-pressure operating state, switch control is executed to quickly switch the state of the regulator 102 to the control-pressure operating state.

Switch Control

Detection of Master-Pressure Operating State

Comparing the broken line and the one-dot chain line in FIG. 7, in an initial period of operation, the hydraulic pressure in the servo chamber 124 indicated by the broken line is greater than a hydraulic pressure in the servo chamber 124 (indicated by the one-dot chain line) in a case where an amount of current supplied to the coil 160s of the pressure-increasing linear valve 160 is a maximum value that is determined by, e.g., specifications of a control circuit including the coil 160s and a switching element for controlling the current supplied to the coil 160s.

In the present embodiment, the hydraulic pressure in the servo chamber 124 (indicated by the one-dot chain line) within an initial time in the case where the amount of current supplied to the coil 160s of the pressure-increasing linear valve 160 is the maximum value is stored as a determination threshold value Psth. When a state in which the actual servo pressure Ps is higher than the determination threshold value Psth has continued for a determination time Ts, it is detected that the regulator 102 is in the master-pressure operating state.

The above-described condition that the state in which the actual servo pressure Ps is higher than the determination threshold value Psth has continued for the determination time Ts is for preventing misdetection due to noises or the like. In other words, the determination time Ts is set at a length of time capable of preventing the misdetection due to noises or the like. Also, the detection of whether the regulator 102 is in the master-pressure operating state or not is performed for the initial time Ta because the master-pressure operating state is easily established during an initial period extending from a start of operation of the brake pedal 24. Also, it is consider that the initial time Ta is a time period in which effects can be obtained in the case where the switch control is executed.

The initial time starts from a point in time when the brake pedal 24 is operated (i.e., a point in time when the state of the regulator 102 is switched from a non-operating state to the operating state). For example, the initial time may start from a point in time when the brake switch 232 is switched from OFF to ON. Also, the start of the initial time may be set at a point in time when an amount of operation of the brake pedal 24 which is detected by the stroke sensor 230 has reached a set amount. In such a case where the start of the initial time is set based on a detection value of, e.g., the stroke sensor 230, the brake switch 232 may not be provided.

In the present embodiment, the determination threshold value is a value which increases with a lapse of time.

It is possible to detect that the regulator 102 is in the master-pressure operating state in the case where the quick and strong operation of the brake pedal 24 is performed in addition to the above-described condition. The master-pressure operating state is easily established in the event of sudden operation of the brake pedal 24.

Switch Control

The switch control is executed from a point in time when it is detected that the regulator 102 is in the master-pressure operating state to a point in time when it is detected that the state of the regulator 102 has been switched to the control-pressure operating state.

a) In the switch control, a rate of flow of the working fluid into the control pressure chamber 122 is larger than in the normal control. In the pressure-increasing linear valve 160, where a difference between the hydraulic pressure produced by the high pressure source 100 and the hydraulic pressure in the control pressure chamber 122 is constant, a degree of opening of the pressure-increasing linear valve 160 increases with increase in an amount of current supplied to the coil 160s, resulting in increase in flow rate at which the working fluid flows into the control pressure chamber 122. Also, in a case where the flow rate at which the working fluid flows into the control pressure chamber 122 is high, a shorter length of time is required for the pilot piston 112 to be moved to its back end position than in a case where the flow rate at which the working fluid flows into the control pressure chamber 122 is low.

Accordingly, in the present embodiment, a change of volume Q required for the pilot piston 112 to be moved to its back end position is divided by a time tc desired for switching the state of the regulator 102 to the control-pressure operating state, to obtain a flow rate q (=Q/tc) of working fluid supplied from the pressure-increasing linear valve 160 to the control pressure chamber 122, and a supply current Iq to be supplied to the coil 160s is determined to obtain the flow rate q. Each of the flow rate q and the supply current Iq may be determined at a predetermined value.

It is noted that the supply current Iq may be a maximum value IMAX and may be a value which is smaller than the maximum value IMAX by a specific value, for example.

Also, the supply current Iq may be a value which is larger than an amount of current to be supplied in the case of the normal control (i.e., an amount of current to be supplied at the point in time when it is detected that the regulator 102 is in the master-pressure operating state) by a specific amount.

b) It is determined that the state of the regulator 102 has been switched to the control-pressure operating state in a case where an increasing amount Δ(dPs/dt) of an increase gradient of the servo pressure dPs/dt becomes greater than an increase-determination threshold value Δth {Δ(dPs/dt)>Δth}. It is considered that the pilot piston 112 is moved backward to the back end position by the working fluid having flowed into the control pressure chamber 122, and thereby the hydraulic pressure in the control pressure chamber 122 is changed from the substantially constant state to the increasing tendency, which also changes the servo pressure Ps to the increasing tendency. The increase-determination threshold value Δth is a value which allows determination that the servo pressure has been changed from a pressure-kept state to the increasing tendency.

Figure 6:
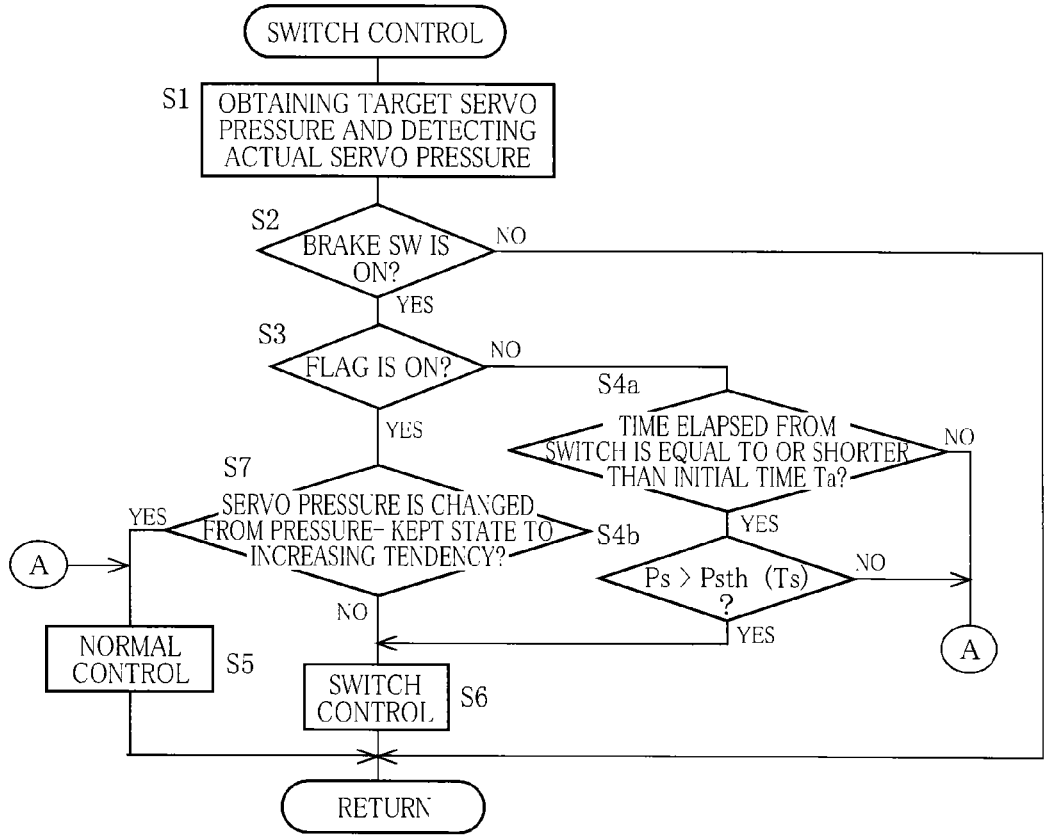
FIG. 6 is a flow chart illustrating a switch control program stored in a storage device of the brake ECU.

A switch control program illustrated in the flow chart in FIG. 6 is executed upon each passage of a predetermined length of time.

At Step 1 (hereinafter abbreviated as "S1" and other steps are similarly abbreviated), the target servo pressure is obtained, and the actual servo pressure is detected. At S2, it is determined whether the brake switch 232 is switched from OFF to ON or not. During the OFF state of the brake switch 232, the processings at S1 and S2 are repeated without execution of the following steps.

When the brake switch 232 is switched to ON, measurement of the initial time Ta is started. At S3, it is determined whether a switch-control in-progress flag is ON or not. When the switch-control in-progress flag is OFF, it is determined at S4a and S4b whether the regulator 102 is in the master-pressure operating state or not.

In the present embodiment, it is determined at S4a whether a time elapsed from the switch of the brake switch 232 from OFF to ON is equal to or shorter than the initial time Ta or not, and it is determined at S4b whether the state in which the actual servo pressure Ps detected by the servo-hydraulic-pressure sensor 156 has continued to be higher than the determination threshold value Psth for the determination time Ts or not. When positive decisions (YES) are made at S4a and S4b, it is determined that the regulator 102 is in the master-pressure operating state.

When the regulator 102 is not in the master-pressure operating state, the normal control is at S5 executed for the linear valve device 103.

When it is determined that the regulator 102 is in the master-pressure operating state, positive decisions (YES) are made at S4a and S4b, and the switch control is executed at S6. As described above, the amount of current to be supplied to the coil 160s of the pressure-increasing linear valve 160 is increased to increase the flow rate. The amount of current to be supplied to the coil 162s of the pressure-reduction linear valve 162 may be the same amount as used in the normal control. Also, when the switch control is started, the switch-control in-progress flag is turned to "ON".

Since the switch-control in-progress flag is ON, a positive decision (YES) is made at S3, it is determined at S7 whether the amount of change in the increase gradient of the actual servo pressure {Δ(dPs/dt)} is greater than the increase-determination threshold value Δth or not. That is, it is determined whether the actual servo pressure has been changed to the increasing tendency or not. When the increase gradient of the actual servo pressure is constant or when the actual servo pressure is substantially constant, a negative decision (NO) is made, and this flow goes to S6 at which the switch control is continuously executed. When the actual servo pressure is changed to the increasing tendency, however, this flow goes to S5 at which the normal control is executed again, and the switch-control in-progress flag is turned to "OFF".

Figure 8:
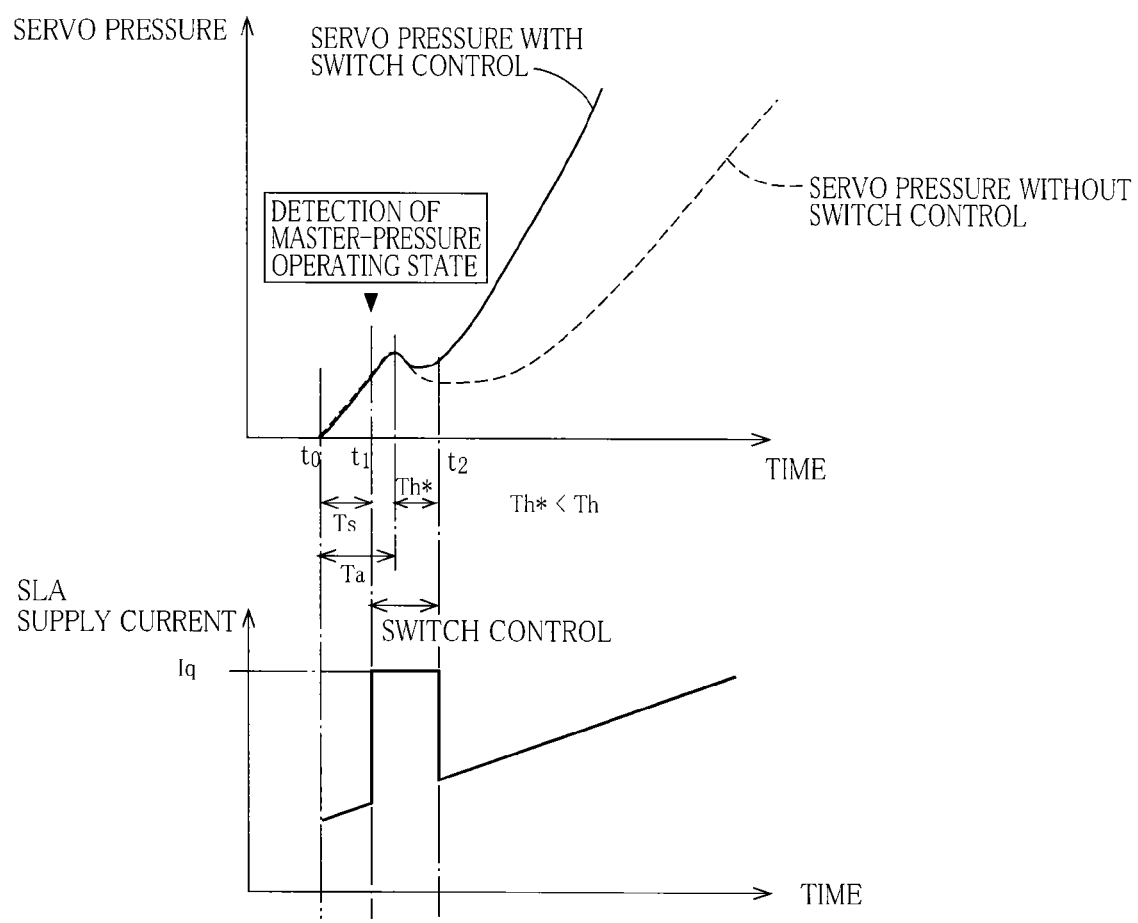
FIG. 8 is a view illustrating a change in the servo pressure and switch control when the switch control program is executed.

FIG. 8 illustrates one specific example in the case where the switch control is executed. At time point t0, the brake switch 232 is turned on, and a measurement of the initial time Ta is started. At time point t1, since the state in which the actual servo pressure is higher than the determination threshold value has continued for the determination time Ts, it is detected that the regulator 102 is in the master-pressure operating state, and the switch control is started. The current to be supplied to the coil 160s of the pressure-increasing linear valve 160 is set at the predetermined value Iq. At time point t2, the actual servo pressure is changed from a pressure-kept tendency to an increasing tendency, and accordingly it is detected that the state of the regulator 102 is switched to the control-pressure operating state. In response, the normal control is started again, so that the amount of current to be supplied to the coil 160s of the pressure-increasing linear valve 160 is changed to the sum of the valve opening current Iopen and the feedback current IFB as illustrated in FIG. 4B.

In the present embodiment as described above, it is detected that the regulator 102 is in the master-pressure operating state, and the switch control is executed when it is detected that the regulator 102 is in the master-pressure operating state. Accordingly, a period in which the actual servo pressure does not increase is a period Th* illustrated in FIG. 8, so that the period in which the actual servo pressure does not increase is shorter than that in the case where the switch control is not executed (Th>Th*). This results in reduction in lowering of the brake feeling, thereby less frequently causing a shortage of the braking force.

In the present embodiment, the servo-hydraulic-pressure sensor 156 and portions of the brake ECU 20 which store and execute the processings at S4a and S4b of the switch control program constitute a master-pressure-operating-state detector, for example. The portions of the brake ECU 20 which store and execute the processing at S4a constitute an initial period detector. Also, portions of the brake ECU 20 which store and execute the processings at S6 and S7 constitute a switch controller. The portions of the brake ECU 20 which store and execute the processing at S6 constitute a supply current controller. The pressure-increasing linear valve 160 is one example of an electromagnetic valve and a flow-rate control valve. The servo chamber 124 corresponds to an output chamber, and the pilot pressure chamber 120 to a master pressure chamber.

In the above-described embodiment, as illustrated in FIG. 7, the state in which the actual servo pressure is suddenly increased is referred to as the master-pressure operating state, a state after the servo pressure is changed to the increasing tendency is referred to as the control-pressure operating state, and a period before the regulator 102 is switched from the master-pressure operating state to the control-pressure operating state is referred to as a time in which the actual servo pressure does not increase. However, the state in which the actual servo pressure does not increase may be included in the master-pressure operating state because the pilot pressure affects the servo pressure in the period in which the actual servo pressure does not increase.

The initial time Ta may be longer than that used in the first embodiment because the time period Th in which the actual servo pressure does not increase can be shortened before the servo pressure is changed to the increasing tendency.

While the determination time Ts is shorter than the initial time Ta in the first embodiment, these times may be equal to each other in length. Also, providing both of the initial time Ta and the determination time Ts is not always necessary.

The determination threshold value may be a fixed value and may be a value determined by the target servo pressure, for example.

It may be detected that the regulator 102 is in the master-pressure operating state when the actual servo pressure is higher than the determination threshold value. Also, it may be detected that the regulator 102 is in the master-pressure operating state when the increase gradient of the servo pressure is greater than a determination gradient threshold value.

The components and devices such as the regulator and the master cylinder may have any constructions that differ from those in the above-described embodiment.

<Second Embodiment>

The present invention is not limited to the case where the regulator 102 becomes the master-pressure operating state in the initial period of operation of the brake pedal 24 and may be applied to a case where the regulator 102 becomes the master-pressure operating state in the event of sudden additional operation.

Figure 9:
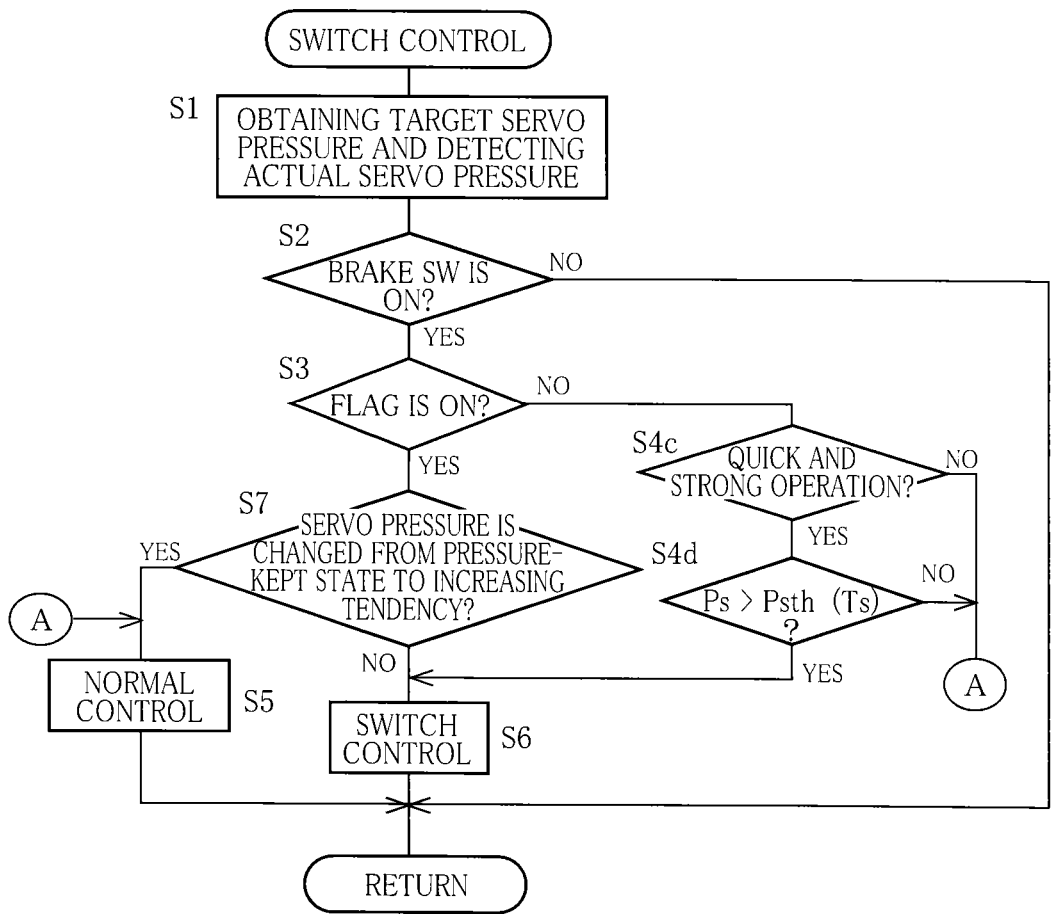
FIG. 9 is a flow chart illustrating a switch control program stored in a storage device of a brake ECU of a hydraulic brake system according to a second embodiment of the present invention.

In the present embodiment, the switch control program illustrated in the flow chart in FIG. 9 is executed. In this flow, it is determined at S4c whether or not the increased speed of the operating stroke which is detected by the stroke sensor 230 is equal to or higher than the predetermined speed and whether or not an operating force corresponding to a hydraulic pressure detected by the operation-related hydraulic sensor 92 is equal to or larger than the predetermined operating force. Furthermore, it is determined at S4d whether the state in which the actual servo pressure is higher than the determination threshold value has continued for equal to or longer than the determination time Ts or not. When positive decisions (YES) are made at S4c and S4d, it is detected that the regulator 102 is in the master-pressure operating state. Here, examples of the determination threshold value include: a value determined based on the target servo pressure; a value which is larger than the target servo pressure by equal to or larger than the set pressure; a value obtained by multiplying the target servo pressure by a set ratio that is larger than one; and a value determined as needed.

Figure 10:
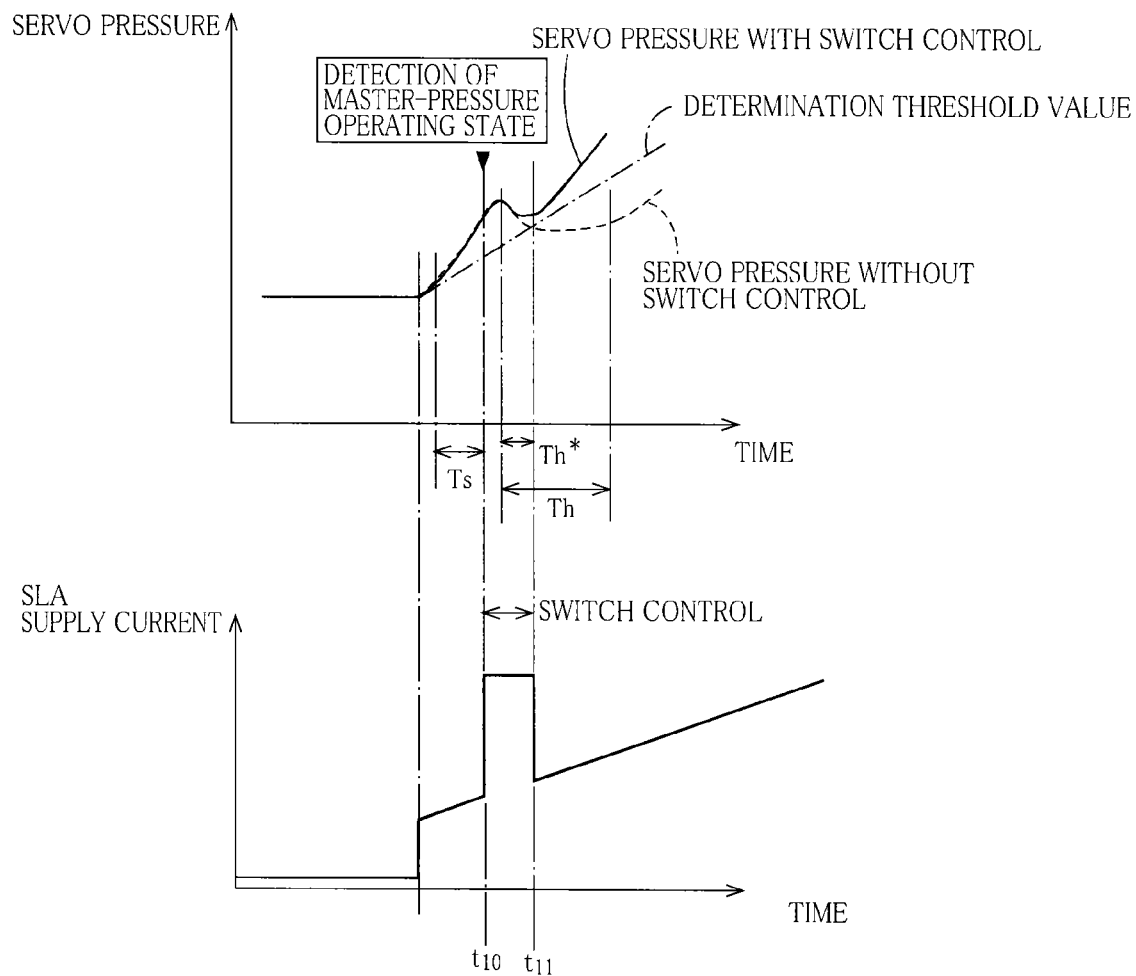
FIG. 10 is a view illustrating a change in a servo pressure and switch control when the switch control program is executed in the second embodiment.

As illustrated in FIG. 10, in the event of sudden additional operation of the brake pedal 24, the following situation may be caused: the hydraulic pressures in the respective front pressure chambers 40, 42 suddenly increase, and the pilot pressure exceeds the control pressure due to a delay in control of the hydraulic pressure in the control pressure chamber 122, thereby switching the regulator 102 to the master-pressure operating state. When it is detected at time point t10 that the regulator 102 is in the master-pressure operating state, the switch control is executed to time point t11.

Even if the sudden additional operation of the brake pedal 24 establishes the master-pressure operating state, the switch control is executed as described above to quickly switch the state of the regulator 102 to the control-pressure operating state. This results in reduction of lowering of the brake feeling, thereby less frequently causing a shortage of the braking force.

In the present embodiment, portions of the brake ECU 20 which store and execute the processing at S4c constitute an operating-state-based detector, for example.

<Third Embodiment>

Figure 11:
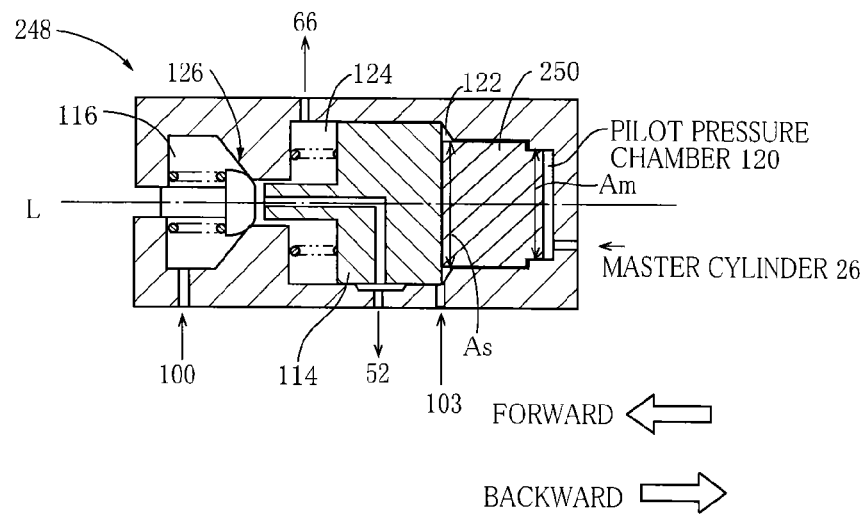
FIG. 11 is a cross-sectional view of a regulator of a hydraulic brake system according to a third embodiment of the present invention.

The regulator may be configured to have a construction illustrated in FIG. 11.

A regulator 248 illustrated in FIG. 11 includes a pilot piston 250 whose pressure receiving area Am with respect to the pilot pressure chamber 120 is smaller than a pressure receiving area As thereof with respect to the control pressure chamber 122 (Am<As).

In the regulator 248, the pressure receiving area Am is smaller than the pressure receiving area As, leading to less establishment of the master-pressure operating state. Also, since the pressure receiving area As is larger than the pressure receiving area Am, even in the case where the hydraulic pressure in the control pressure chamber 122 is lower than the hydraulic pressure in the pilot pressure chamber 120, it is possible to move the pilot piston 250 backward. This construction provides various advantages such as suppression of delay in braking.

In alternative embodiments, the present hydraulic brake system may be installed on hybrid vehicles, electric vehicles, fuel-cell vehicles, and internal combustion vehicles, for example.

While the embodiments of the present invention have been described above, it is to be understood that the invention is not limited to the details of the illustrated embodi-

What is claimed is:

1. A hydraulic brake system, comprising:
a master cylinder comprising at least one pressurizing piston;
a plurality of brake cylinders provided respectively for a plurality of hydraulic brakes which are operated by a hydraulic pressure in at least one front pressure chamber respectively defined in front of the at least one pressurizing piston; and
a rear-hydraulic pressure controller connected to a rear chamber defined at a rear of one of the at least one pressurizing piston, the rear-hydraulic pressure controller being configured to control a hydraulic pressure in the rear chamber,
the rear-hydraulic pressure controller comprising:
a regulator operable by at least one of the hydraulic pressure in at least one of the at least one front pressure chamber and a control pressure controlled electrically, the regulator being configured to supply an output hydraulic pressure to the rear chamber;
an initial period detector configured to detect whether the output hydraulic pressure is greater than a determination threshold value, over an initial time starting from a point in time when a state of the brake operating member is switched from a non-operated state to an operated state, the determination threshold value being a value which increases with a lapse of time; and
a master-pressure-operating-state detector configured to, when a state in which the initial period detector detects that the output hydraulic pressure is greater than the determination threshold value has continued for a time that is equal to or greater than a determination time, detect that the regulator is in a master-pressure operating state in which the regulator is operated by at least the hydraulic pressure in the at least one of the at least one front pressure chamber.

2. The hydraulic brake system according to claim 1, wherein the regulator comprises:
two pistons arranged in a row in an axial direction thereof;
a control pressure chamber defined at a rear of one piston of the two pistons;
an output chamber defined in front of the one piston; and
a master pressure chamber which is defined at a rear of another piston of the two pistons and to which the hydraulic pressure in the at least one of the at least one front pressure chamber is supplied, and
wherein the control pressure is a hydraulic pressure in the control pressure chamber, and the output hydraulic pressure is a hydraulic pressure in the output chamber.

3. The hydraulic brake system according to claim 2, wherein the rear-hydraulic pressure controller comprises:
an electromagnetic valve capable of controlling a flow rate of working fluid allowed to flow into the control pressure chamber;
a normal controller configured to control the electromagnetic valve in a control-pressure operating state in which the regulator is operated by the control pressure, to control the control pressure such that the output hydraulic pressure is brought closer to a target value; and
a switch controller configured to execute switch control in which a state of the regulator is switched to the control-pressure operating state, when the master-pressure-operating-state detector has detected that the regulator is in the master-pressure operating state, and
wherein the switch controller comprises a flow rate controller configured to control the electromagnetic valve such that the flow rate is greater in the control executed by the switch controller than in the control executed by the normal controller.

4. The hydraulic brake system according to claim 3, wherein the electromagnetic valve is a flow-rate control valve configured to make the flow rate of working fluid allowed to flow into the control pressure chamber, greater in a case where an amount of current supplied to a coil of the electromagnetic valve is large than in a case where the amount of current supplied to the coil of the electromagnetic valve is small, and
wherein the switch controller comprises a current controller configured to supply a greater amount of current to the coil of the electromagnetic valve in the control executed by the switch controller than in the control executed by the normal controller.

5. The hydraulic brake system according to claim 3, wherein the switch controller is configured to move said another piston to a back end position.

6. The hydraulic brake system according to claim 1, wherein the rear-hydraulic pressure controller comprises a switch controller configured to, when the master-pressure-operating-state detector has detected that the regulator is in the master-pressure operating state, execute switch control in which a state of the regulator is switched from the master-pressure operating state to a control-pressure operating state in which the regulator is operated by the control pressure.

7. The hydraulic brake system according to claim 6, wherein the switch controller is configured to complete the switch control when it is detected that the state of the regulator has been switched to the control-pressure operating state.

8. The hydraulic brake system according to claim 6, wherein the switch controller is configured to execute the switch control until the output hydraulic pressure changes from a substantially constant state to an increasing tendency.

9. The hydraulic brake system according to claim 1, wherein the master cylinder comprises (i) a transmitter capable of transmitting a forward movement force to one pressurizing piston of the at least one pressurizing piston and (ii) an input piston provided at a rear of the transmitter, with an input chamber interposed therebetween, the input piston being engaged with a brake operating member operable by a driver.

10. A hydraulic pressure controller, comprising:
a regulator configured to control an output hydraulic pressure by being operated by at least one of a pilot pressure and a control pressure controlled electrically; and
an operating-state switch controller configured to, when the output hydraulic pressure is greater than a determination threshold value, execute switch control to switch a state of the regulator from a pilot-pressure operating state in which the regulator is operated by at least the pilot pressure, to a control-pressure operating state in which the regulator is operated by the control pressure, wherein the hydraulic pressure controller is connected to a rear chamber provided at a rear of one pressurizing piston of at least one pressurizing piston of a master cylinder, wherein the one pressurizing piston is capable of moving forward due to an operation of a driver for moving a brake operating member forward, wherein the one pressurizing piston is capable of moving forward due to an operation of a driver for moving the brake operating member forward, wherein a hydraulic pressure in a front pressure chamber defined in front of the one pressurizing piston is the pilot pressure, and wherein the hydraulic pressure controller comprises an operating-state-based detector configured to detect that the regulator is in the pilot-pressure operating state, in at least one of a case where an operating speed of the brake operating member is greater than a predetermined speed and a case where an operating force applied to the brake operating member is greater than a predetermined operating force.

\* \* \* \* \*